United States Patent
Huber, Jr.

(10) Patent No.: US 12,354,395 B2
(45) Date of Patent: Jul. 8, 2025

(54) DATABASES, DATA STRUCTURES, AND DATA PROCESSING SYSTEMS FOR COUNTERFEIT PHYSICAL DOCUMENT DETECTION

(71) Applicant: ID Metrics Group Incorporated, Manchester, NH (US)

(72) Inventor: Richard Austin Huber, Jr., Weehawken, NJ (US)

(73) Assignee: ID Metrics Group Incorporated, Kirkland, WA (US)

( * ) Notice: Subject to any disclaimer, the term of this patent is extended or adjusted under 35 U.S.C. 154(b) by 1023 days.

(21) Appl. No.: 17/104,340

(22) Filed: Nov. 25, 2020

(65) Prior Publication Data

US 2021/0158036 A1    May 27, 2021

Related U.S. Application Data

(60) Provisional application No. 62/940,880, filed on Nov. 26, 2019.

(51) Int. Cl.
*G06V 30/413* (2022.01)
*G06V 10/82* (2022.01)
(Continued)

(52) U.S. Cl.
CPC ............ *G06V 30/413* (2022.01); *G06V 10/82* (2022.01); *G06V 30/194* (2022.01); *G06V 40/168* (2022.01)

(58) Field of Classification Search
CPC .... G06V 30/413; G06V 40/168; G06V 10/82; G06V 30/194; G06V 30/414;
(Continued)

(56) References Cited

U.S. PATENT DOCUMENTS 10,043,071 B1 * 8/2018 Wu ..................... G06V 30/413
10,515,266 B1 * 12/2019 Jarvis ................... G06T 7/0002
(Continued)

FOREIGN PATENT DOCUMENTS

CN    109429519 A  *  3/2019  .............. G06K 9/00
CN    106599772       4/2020
(Continued)

OTHER PUBLICATIONS

Usilin, S. & Nikolaev, Dmitry & Sholomov, Dmitry, Guilloche elements recognition applied to passport page processing, (2011), In Proceedings of the 8th Open German-Russian Workshop Pattern Recognition and Image Understanding OGRW-8-2011, pp. 303-306. (Year: 2011).*

(Continued)

*Primary Examiner* — Utpal D Shah
*Assistant Examiner* — Jack Peter Kraynak
(74) *Attorney, Agent, or Firm* — Fish & Richardson P.C.

(57) ABSTRACT

Methods, systems, and apparatuses, including computer programs, for counterfeit document detection. In one aspect, a method includes obtaining first data representing a first image, providing the obtained first data as an input to a machine learning model that has been trained to determine whether data representing an input image deviates from data representing one or more images of a physical document printed in accordance with a particular anticounterfeiting architecture, obtaining second data that represents output data generated, by the machine learning model, based on the machine learning model processing the obtained first data as an input, determining, based on the obtained second data, whether the first image deviates from data representing one or more images of a physical document printed in accordance with a particular anticounterfeiting architecture, and
(Continued)

storing third data indicating that a document, from which the first image was obtained, is a counterfeit document.

21 Claims, 12 Drawing Sheets

(51) Int. Cl.
*G06V 30/194* (2022.01)
*G06V 40/16* (2022.01)

(58) Field of Classification Search
CPC ........ G06V 30/40; G06V 30/41; G06V 40/16; G06V 30/192; G06V 10/70
See application file for complete search history.

(56) References Cited

U.S. PATENT DOCUMENTS

| | | | |
|---|---|---|---|
| 2017/0286765 A1* | 10/2017 | Rodriguez | G06V 30/416 |
| 2018/0107887 A1* | 4/2018 | Huber, Jr. | G06V 30/412 |
| 2018/0108101 A1* | 4/2018 | Rodriguez | G06K 7/1417 |
| 2019/0197642 A1 | 6/2019 | Rodriguez et al. | |
| 2020/0134371 A1* | 4/2020 | Charraud | G06V 10/82 |
| 2020/0184212 A1* | 6/2020 | Anthony Samy | G06N 20/20 |
| 2021/0019519 A1* | 1/2021 | Martin | G06F 18/217 |

FOREIGN PATENT DOCUMENTS

| | | | | |
|---|---|---|---|---|
| CN | 106599772 B | * | 4/2020 | ......... G06K 9/00228 |
| DE | 10 2008 041 944 | | 3/2010 | |
| WO | WO-2015196084 A1 | * | 12/2015 | ............. G06F 21/44 |

OTHER PUBLICATIONS

A. Berenguel Centeno, O. Ramos Terrades, J. Llados Canet and C. Cañero Morales, "Recurrent Comparator with Attention Models to Detect Counterfeit Documents," 2019 International Conference on Document Analysis and Recognition (ICDAR), Sydney, NSW, Australia, 2019, pp. 1332-1337 (Year: 2019).*

D. Saez-Trigueros, H. Hertlein, L. Meng and M. Hartnett, "Shape and texture combined face recognition for detection of forged ID documents," 2016 39th International Convention on Information and Communication Technology, Electronics and Microelectronics (MIPRO), Opatija, Croatia, 2016, pp. 1343-1348 (Year: 2016).*

Extended European Search Report in European Appln. No. 20891514.0, dated Sep. 12, 2022, 9 pages.

Usilin et al., "Guilloche elements recognition applied to passport page processing," In Proceedings of the 8th Open German-Russian Workshop Pattern Recognition and Image Understanding, Aug. 2011, 303-306.

International Preliminary Report on Patentability in International Appln. No. PCT/US2020/062274, dated Jun. 9, 2022, 16 pages.

PCT International Search Report and Written Opinion in International Appln. No. PCT/US2020/062274, dated Jan. 15, 2021, 17 pages.

Usilin et al., "Guilloche Elements Recognition Applied to Passport p. Processing," Proceedings of the 8th Open German-Russian Workshop Pattern Recognition and Image Understanding, 2011, pp. 303-306.

* cited by examiner

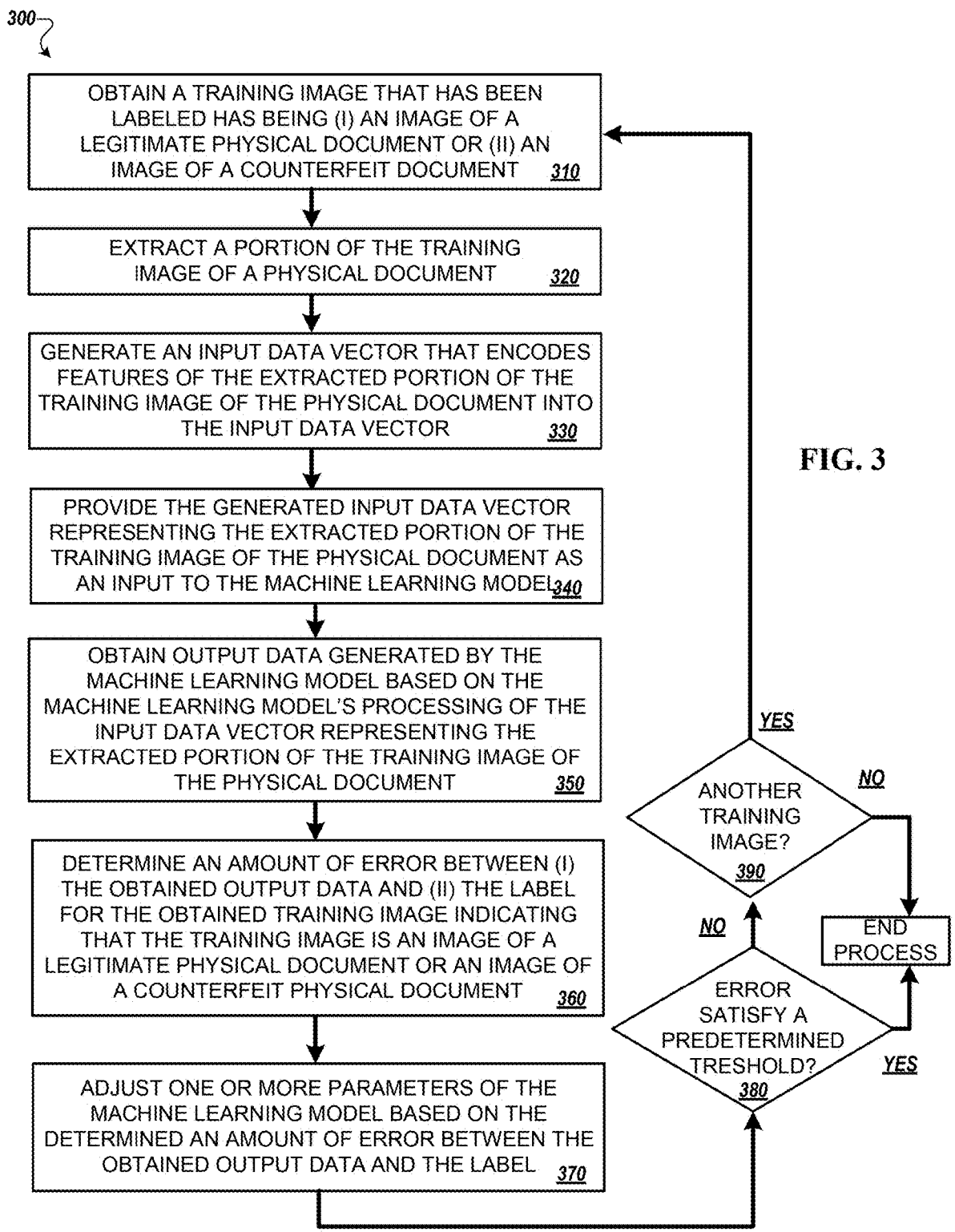

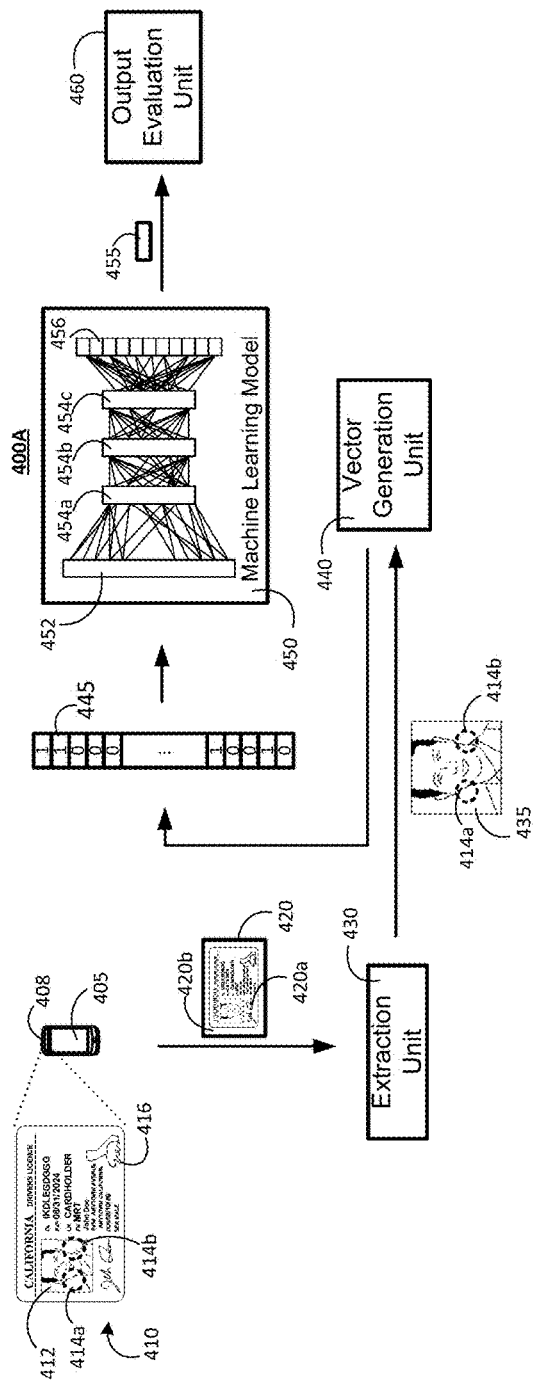
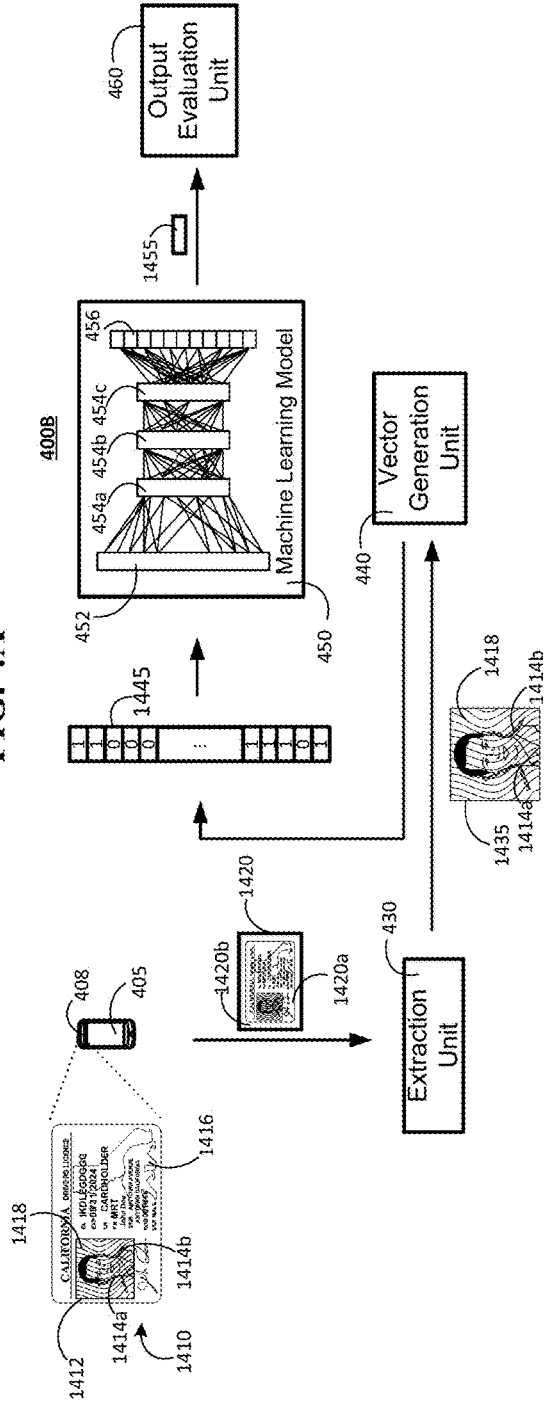
FIG. 4A
FIG. 4B

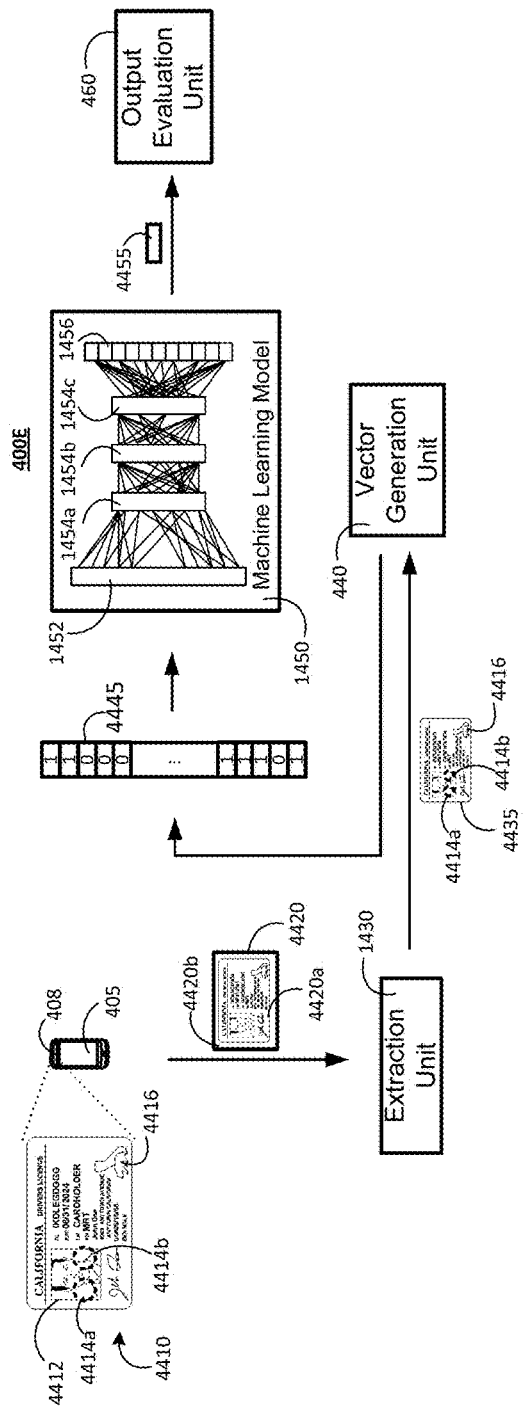
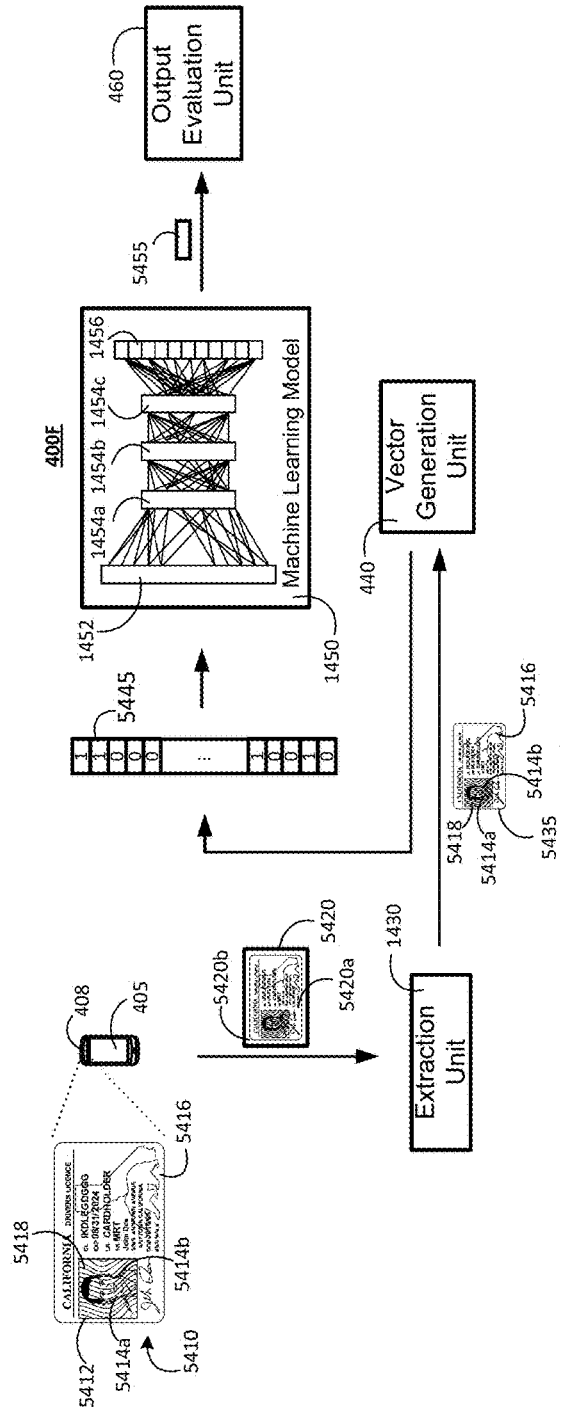
FIG. 4E
FIG. 4F

DATABASES, DATA STRUCTURES, AND DATA PROCESSING SYSTEMS FOR COUNTERFEIT PHYSICAL DOCUMENT DETECTION

CROSS-REFERENCE TO RELATED APPLICATION

This application claims the benefit under 35 U.S.C. § 119(e) of U.S. Patent Application No. 62/940,880, entitled "Databases, Data Structures, And Data Processing Systems For Counterfeit Physical Document Detection," filed Nov. 26, 2019, which is incorporated herein by reference in its entirety.

BACKGROUND

Persons can create counterfeit documents for a variety of reasons. Detection of such counterfeit documents is an important operation for many entities including financial services organizations, retail outlets, government agencies, among many others.

SUMMARY

According to one innovative aspect of the present disclosure, a method for counterfeit document detection is disclosed. In one aspect, the method can include obtaining, by the data processing system, first data representing a first image, providing, by the data processing system, the obtained first data as an input to a machine learning model that has been trained to determine whether data representing an input image deviates from data representing one or more images of a physical document that have been printed in accordance with a particular anticounterfeiting architecture, obtaining, by the data processing system, second data that represents output data generated, by the machine learning model, based on the machine learning model processing the obtained first data as an input, determining, by the data processing system and based on the obtained second data, whether the first image deviates from data representing one or more images of a physical document that have been printed in accordance with a particular anticounterfeiting architecture, comprising: evaluating the obtained second data against a predetermined threshold, and based on a determination that the obtained second data satisfies a predetermined threshold, storing third data indicating that a document, from which the first image was obtained, is a counterfeit document.

Other versions include corresponding systems, apparatus, and computer programs to perform the actions of methods defined by instructions encoded on computer readable storage devices.

These and other versions may optionally include one or more of the following features. For instance, in some implementations, obtaining, by the data processing system, first data representing a first image can include capturing, using a camera, second data representing an image of a document, and extracting, from the second data representing an image of the document, the first data representing a first image, wherein the first image is an image of at least a portion of a person.

In some implementations, obtaining, by the data processing system, first data representing a first image can include receiving, from a device that used a camera to capture second data representing an image of a document, the second data representing an image of the document, and extracting, from the second data representing an image of the document, the first data representing the first image.

In some implementations, obtaining, by the data processing system, first data representing a first image can include receiving, from a device, the first data representing the first image.

In some implementations, the anticounterfeiting architecture can include two or more security features.

In some implementations, the two or more security features can include two or more of (i) presence of a predetermined facial aspect ratio, (ii) presence of a predetermined head orientation, (iii) presence of a drop shadow, (iv) presence of guilloche lines over a facial image, or (v) presence of a predetermined graphic.

In some implementations, the machine learning model that has been trained to determine whether data representing an input image deviates from data representing one or more images of a physical document that have been printed in accordance with a particular anticounterfeiting architecture can include one or more security feature discriminator layers that have been trained to detect the (i) presence of a security feature or (ii) absence of a security features.

In some implementations, the method can further include obtaining, by the data processing system, fourth data representing a second image, providing, by the data processing system, the obtained fourth data as an input to a machine learning model that has been trained to determine whether data representing an input image deviates from data representing one or more images of a physical document that have been printed in accordance with a particular anticounterfeiting architecture, obtaining, by the data processing system, fifth data that represents output data generated, by the machine learning model, based on the machine learning model processing the obtained fourth data as an input, determining, by the data processing system and based on the obtained fifth data, whether the second image deviates from data representing one or more images of a physical document that have been printed in accordance with a particular anticounterfeiting architecture, comprising: evaluating the obtained fifth data against a predetermined threshold, and based on a determination that the obtained fifth data does not satisfy a predetermined threshold, storing sixth data indicating that a document, from which the second image was obtained, is a legitimate document.

In some implementations, training the machine learning model can include accessing, by the machine learning model, a plurality of training images of respective physical documents, wherein each training image of the plurality of training images have been labeled as (i) an image of a legitimate physical document or (ii) an image of a counterfeit physical document, and for each particular image of the plurality of training images: extracting a particular portion of the particular image of a physical document, generating an input vector for the extracted particular portion of the particular image of a physical document, processing, by the machine learning model, the generated input vector through one or more hidden layers of the machine learning model, obtaining output data, generated by the machine learning model based on the machine learning model's processing of the generated input vector representing the extracted particular portion of the particular image of the physical document, determining an amount of error that exists between the obtained output data and a label for the particular image, and adjusting one or more parameters of the machine learning model based on the determined amount of error.

These and other aspects of the present disclosure are discussed in more detail in the detailed description below with reference to the accompanying drawings.

BRIEF DESCRIPTION OF THE DRAWINGS

FIG. 3 is flowchart of an example of a training process for training a machine learning model to detect counterfeit physical documents.

FIG. 4A is an example of a runtime system that determines whether a physical document is a counterfeit physical document using a machine learning model that is trained to detect counterfeit physical documents.

FIG. 4B is another example of a runtime system that determines whether a physical document is a counterfeit physical document using a machine learning model that is trained to detect counterfeit physical documents.

FIG. 4E is another example of a runtime system that determines whether a physical document is a counterfeit physical document using a machine learning model that is trained to detect counterfeit physical documents.

FIG. 4F is another example of a runtime system that determines whether a physical document is a counterfeit physical document using a machine learning model that is trained to detect counterfeit physical documents.

DETAILED DESCRIPTION

Figure 1:
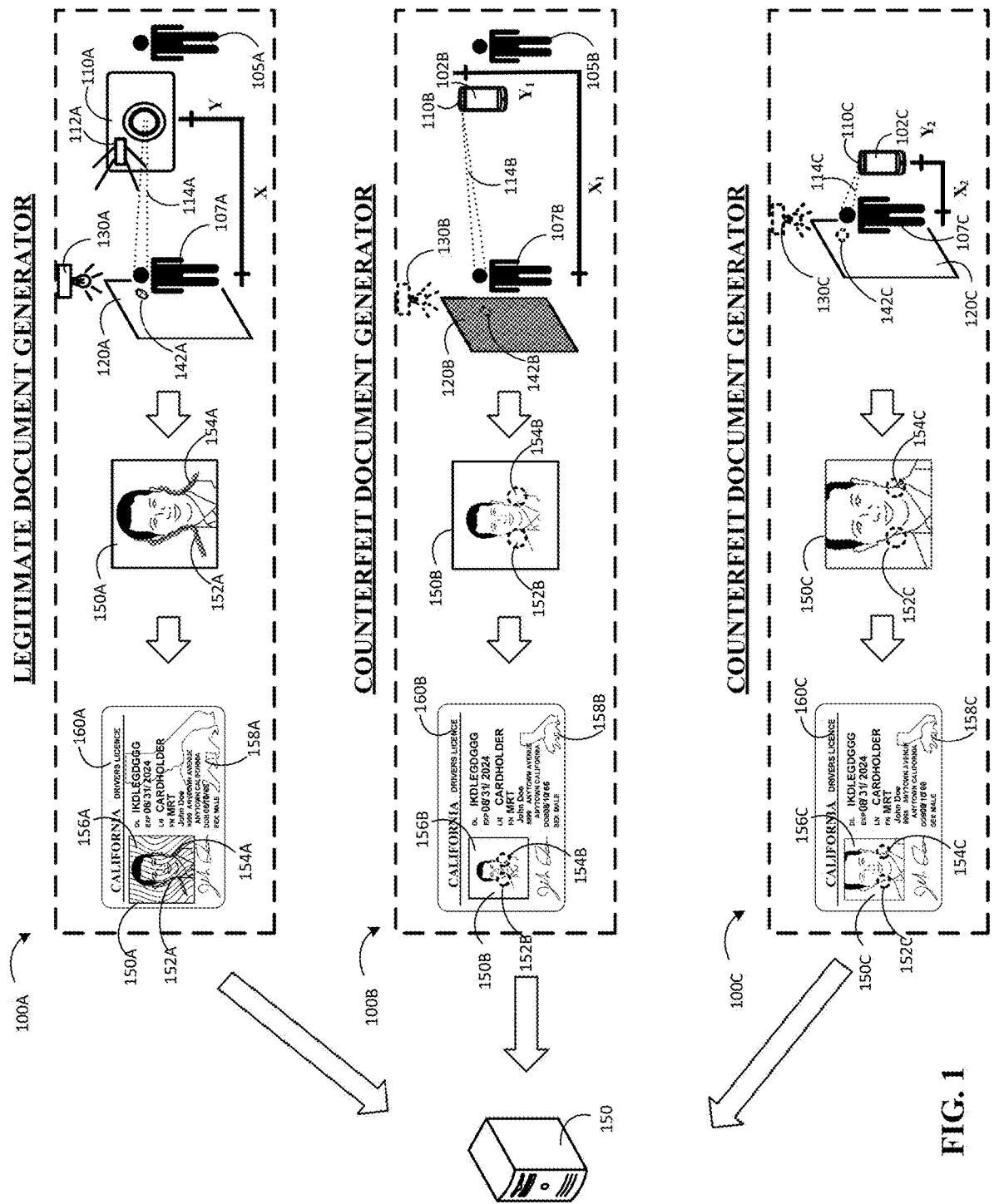
FIG. 1 is a contextual diagram that describes examples of processes for generating physical documents.

The present disclosure is directed towards methods, systems, and computer programs for detecting counterfeit physical documents. In one aspect, a machine learning model can be trained to distinguish between an image that depicts a legitimate physical document and an image that depicts a counterfeit physical document. A legitimate physical document is a document that is created to comply with a legitimate anticounterfeiting architecture. A counterfeit physical document is a document that is created without complying with a legitimate anticounterfeiting architecture. A legitimate anticounterfeiting architecture, which may be referred to herein as an "anticounterfeiting architecture," can include a group of two or more anticounterfeiting security features whose collective presence or absence in an image of a physical document provide an indication of the physical documents legitimacy. For purposes of this disclosure, a physical document can include a driver's license, a passport, or any form of physical identification that includes a facial image of a person identified by the form of physical identification.

"Security features" of an anticounterfeiting architecture is a term that refers to a feature of an anticounterfeiting architecture whose presence or absence in an image of a physical document can be detected by a machine learning model trained in accordance with the present disclosure. In some implementations, a machine learning model trained in accordance with the disclosure can detect absence of a security feature where it should exist, presence of a security feature where it should not exist, incorrect security features, or abnormal security features. Security features can include presence, absence, or placement of natural background, artificial background, natural lighting, artificial lighting, natural shadow, artificial shadow, absence of flash shadow such as a drop shadow, head size abnormalities, head aspect ratio abnormalities, head translation abnormalities, abnormal color temperatures, abnormal coloration, aligned and configured flash lighting, off-angle illumination, focal plan abnormalities, bisection of a focal plane, use of fixed focal length lenses, imaging effects related to requanitization, imaging effects related to compression, abnormal head tilt, abnormal head pose, abnormal head rotation, non-frontal facial effects, presence of facial occlusions such as glasses, hats, head scarfs, or other coverage, abnormal head shape dynamics, abnormal head aspect ratio to intereye distances, abnormal exposure compensation between foreground and background, abnormal focus effects, image stitching effects indicating different digital sources, improper biometric security feature printing, improper security feature layering such as improper OVD, OVI, hologram, other secondary security feature overlays over a face or other portion of a document, improper tactile security feature placement near face, over a face, or other portion of a document, improper final face print, improper laser black and white, improper color laser, improper layered ink print, improper printing techniques, improper print layer sequencing, or the like.

The present disclosure is directed towards a solution to problems in the art of detecting counterfeit documents that relates to identifying counterfeits of a physical document by analyzing images of the physical document. Such a process has significant challenges that differ from detecting counterfeits of digital images.

An example of a counterfeit digital image that is easy to detect using conventional systems can include a first image of a first person A whose head was (i) digitally removed from the first image and then (ii) digitally replaced by a second image of a head of person B. Such a counterfeit digital image can be easy to detect using conventional systems because computers can be programmed to identify discontinuities that exist between the first image and the second image. For example, a computer can be programmed to analyze the actual numerical values in a vector matrix representing the modified first image having the body of person A and the head of person B after the modified first image has been placed into an editor such as photoshop. In such a scenario, the computer can detect, based on the vector matrix representing the modified first image, extreme discontinuities in the values of the vector matrix representing the modified first image between the body of person A and the head of person B.

However, these, and other, discontinuities are masked when the modified image is saved and printed onto a physical document. By way of example, saving an image causes the modified image to be formatted in a way, such as by compressing image features, that smooths out the discontinuities that may exist in the saved image. By way of another example, when an image is printed out on a physical document, the inks used to print the image are an approximation of the image. In some instances, a dot matrix can be used to print the image. This dot matrix is an approximation that can smooth out discontinuities in an image. Accordingly, operations such as saving an image, quantizing the image, compressing the image, printing the image, and then reimaging the image can result in discontinuities, which may be easily detected by conventional systems prior to these aforementioned operations on the image, to be completely smoothed out and no longer detectable using conventional systems.

The present disclosure addresses this problem in the art by providing a method of training a machine learning model to detect counterfeit physical documents based on processing images of physical documents. In more detail, the present disclosure describes training a security feature discriminator layer of a machine learning model that can be used to detect counterfeit physical documents. The security feature discriminator layer can include multiple security feature discriminators that are each configured to detect the presence or absence of security features of an anticounterfeiting architecture in images of physical documents. Data representing determinations of security feature discriminators of the security feature discriminator layer of the machine learning model can be propagated through the layers of the machine learning model that remain after the security feature discriminator layer and used, by the machine learning model, in generating an output score by the machine learning model. Once the machine learning model is trained by, for example, minimizing a loss function, the output score produced by the trained machine learning model based on the machine learning model's processing of an image of a physical document can then be evaluated to determine whether the image of a physical document input into, and processed by, the machine learning model is an image of a counterfeit document.

FIG. 1 is a contextual diagram that describes examples of processes for generating physical documents. These examples include a first example process 100A for generating an example of a legitimate physical document, a second example process 100B for generating a counterfeit physical document, and a third example process 100C for generating a counterfeit physical document.

Example of Legitimate Physical Document Generation

The process 100A is an example of a process for generating a legitimate physical document. The process 100A includes a first person 105A using a camera 110A to generate an image 150A for inclusion in a legitimate physical document 160A such as a driver's license or passport. In some implementations, the camera 110A can include a camera that is configured to generate images for inclusion in legitimate documents. A camera that is configured to generate images for inclusion in legitimate documents can be a camera that is configured to generate images of a particular quality. Such a camera may be required to generate images that satisfy threshold levels related to one or more of megapixels, lighting, contrast, color gamut, aspect ratio, or other image features. In some implementations, the camera 110A can also be configured to have a flash 112A that produces a threshold amount of lumens necessary to produce a drop shadow 142A on a background 120A behind the person 107A being photographed by the camera 110A.

In some implementations, to comply with a particular anticounterfeiting architecture, an image can be properly generated by a camera 110A for inclusion in a legitimate physical document 160A when the camera is a distance X away from the person 107A and the camera is positioned at a height Y. In some instances, the distance X and height Y can be determined in a manner that creates a proper facial aspect ratio of person 107A's face and a particular focal plane 114A as required by a particular anticounterfeiting architecture. Once a particular distance X and height Y are determined and used during a process 100A for generating legitimate physical documents, a machine learning model described in accordance with the present disclosure can be trained to detect counterfeit images of physical documents that have been generated by cameras at different distances such as $X_1$ or $X_2$, e.g., resulting in a different facial aspect ratio, different heights $Y_1$ or $Y_2$, e.g., resulting in an increasing or decreasing focal plane, or any combination thereof.

In process 100A, an image 150A generated using a combination of lighting 130A, camera 110A at distance X and height Y having flash 112A that is positioned on a level focal plane 114a, and background 120A can be printed into a legitimate physical document 160A. The image 150A can include security features such as a drop shadow 152A, 154A behind the head of person 107A. In addition, the image 150A depicts the head of the person 107A on a level focal plane and having a first facial aspect ratio. The first facial aspect ratio may be designated by a particular anticounterfeiting architecture that is used to create the legitimate physical document 160A. A machine learning model described in accordance with the present disclosure can be trained to detect counterfeit images of physical documents having a facial image generated by different and having a different aspect ratio than the first aspect ratio.

The legitimate physical document 160A can include an anticounterfeiting architecture that includes security features such as a drop shadow 152A, 154A, guilloche lines 156A, and properly sized graphics 158A. A particular anticounterfeiting architecture that makes a physical document legitimate can vary from jurisdiction to jurisdiction. However, the present disclosure can aggregate a first set of images of respective legitimate physical documents and a second set of images of respective counterfeit physical documents and then train a machine learning model, as described herein, to distinguish images of the first set from images of the second set. For example, if a legitimate anticounterfeiting architecture is determined to include a drop shadow, particular guilloche lines, and particular graphics, the present disclosure can be used to train a machine learning model to detect images of physical documents that do not include one or more of the drop shadow, the particular guilloche lines, or the particular graphics, in their respective locations, as required by the legitimate anticounterfeiting architecture. Accordingly, the present disclosure is not limited to any one particular anticounterfeiting architecture and can be used to train a machine learning model to detect counterfeit physical documents that fail to comply with any anticounterfeiting architecture.

First Example of Counterfeit Physical Document Generation

The process 100B is an example of generation of a counterfeit physical document. The process 100B includes a first person 105B using a camera 110B of a smartphone 102B to generate an image 150B for inclusion in a counterfeit physical document 160B such as a counterfeit driver's license or counterfeit passport. In this example, the camera 110B of smartphone 102B is held at a higher height $Y_1$ than height Y of camera 110A in process 100A. This causes an image 105B to be generated that has an increased focal plane 114B. In addition, in the example of process 100B, the camera 110B of the smartphone 102B is positioned at a distance $X_1$ from the person 107B that is further than the distance X between the camera 110A and the person 107A in process 100A. This can cause the facial aspect ratio of the person 107B shown in image 150B to be smaller than the facial aspect ratio of the person 107A in a legitimate image 150A.

In the example of process 100B, a different background surface 120B, lack of sufficient lighting conditions 130B, increased focal plane 114B, or a combination thereof, are used during generation of image 150B using camera 110B of smartphone 102B. The different background surface 120B, lack of sufficient lighting conditions 130B, increased focal plane 114B, or a combination thereof, may not create a proper drop shadow at location 142B. Accordingly, the different background surface 120B, lack of sufficient lighting conditions 130B, increased focal plane 114B, or a combination thereof, can result in an image 150B, generated by camera 110B of smartphone 102B, that does not include a drop shadow in image 150B at locations of image 150B such as locations 152B, 154B where a drop shadow would occur in a legitimate image such as image 150A that includes drop shadows 152A, 154A. The image 150B is printed onto the counterfeit document 160B during the process 100B.

The counterfeit document 160B that results from the process 100B lacks notable security features of the example anticounterfeiting architecture described with reference to process 100A. For example, the counterfeit document 160B has a profile image 150B that is of a different aspect ratio than a legitimate image 150A that results, for example, because of distance $X_1$ being greater than the distance X—though other factors may cause a different aspect ratio such as differences between the specifications of the camera 110A and the camera 110B. By way of another example, the counterfeit document 160B lacks a profile image of the face of person 107B that includes drop shadows, as it can be seen in FIG. 1 that there is no drop shadow in locations 152B, 154B of image 150B, where a drop shadow is expected to appear as shown in image 150A. Moreover, the counterfeit document 160B lacks other security features as, when viewed in comparison with legitimate physical document 160A, it can be seen that counterfeit physical document 160B does not include guilloche lines 156B and has improperly sized graphics 158B.

Second Example of Counterfeit Physical Document Generation

The process 100C is another example of generation of a counterfeit physical document. The process 100C includes a person 107C using a camera 110C of a smartphone 102C to generate a "selfie" image 150C for inclusion in a counterfeit physical document 160C such as a counterfeit driver's license or counterfeit passport. In this example, the camera 110C of smartphone 102C is held at a lower height $Y_2$ than height Y of camera 110A of process 100A. This causes an image 105C to be generated that has a decreased focal plane 114C. In addition, in the example of process 100C, the camera 110C of the smartphone 102C is positioned at a distance $X_2$ from the person 107C that is less than the distance X between the camera 110A and the person 107A in process 100A. This can cause the facial aspect ratio of the face of person 107C shown in image 150C to be larger than the facial aspect ratio of the face of person 107A in a legitimate image 150A.

In addition, in the example of process 100C, a lack of sufficient lighting conditions 130C and a decreased focal plane 114C are used during generation of image 150C using camera 110C of smartphone 102C. The lack of sufficient lighting conditions 130C, decreased focal plane 114C, or a combination thereof, may not create a proper drop shadow at location 142C. Accordingly, the lack of sufficient lighting conditions 130C, decreased focal plane 114C, or a combination thereof, can result in an image 150C, generated by camera 110C of smartphone 102C, that does not include a drop shadow in image 150C at locations of image 150C such as locations 152C, 154C where a drop shadow would occur in a legitimate image such as image 150A that includes drop shadows 152A, 154A. The image 150C is printed onto the counterfeit document 160C during the process 100C.

The counterfeit document 160C that results from the process 100C lacks notable security features of the example anticounterfeiting architecture described with reference to process 100A. For example, the counterfeit document 160C has a profile image 150C that is of a different aspect ratio than a legitimate image 150A that results, for example, because of distance $X_2$ being less than the distance X—though other factors may cause a different aspect ratio such as differences between the specifications of the camera 110A and the camera 110C. By way of another example, the counterfeit document 160C lacks a profile image of the face of person 107C that includes drop shadows, as it can be seen in FIG. 1 that there is no drop shadow in locations 152C, 154C of image 150C, where a drop shadow is expected to appear as shown in image 150A. Moreover, the counterfeit document 160C lacks other security features as, when viewed in comparison with legitimate physical document 160A, it can be seen that counterfeit physical document 160C does not include guilloche lines at 156C and has improperly sized graphics 158C.

Legitimate Physical Documents vs. Counterfeit Physical Documents

The description of processes 100A, 100B, 100C is provided to compare and contrast an example of legitimate physical document creation vs. counterfeit physical document creation. These examples are not provided as hard and fast rules. Moreover, legitimate physical documents may be created that include an anticounterfeiting architecture having more, less, or different security features than the legitimate physical document 160A described with reference to process 100A. However, once a set of legitimate physical documents are identified as having a particular anticounterfeiting architecture such as the anticounterfeiting architecture of legitimate physical document 160A, physical documents that are created can be identified as counterfeit physical documents if the created physical document does not have each of the security features specified by the anticounterfeiting architecture of the set of legitimate physical documents. Anticounterfeiting architectures can vary from jurisdiction to jurisdiction and change over time.

The aforementioned description of legitimate physical documents and counterfeit physical documents uses terms such as "normal," "proper," "sufficient," "adequate," "natural," or the like with reference to security features of, or environmental conditions giving rise to a security feature of, an anticounterfeiting architecture and "abnormal," "improper," "insufficient" (or lack of sufficient), "inadequate," "unnatural," or the like when referencing aspects of, or environmental conditions related to, a counterfeit physical document. A security feature or environmental condition giving rise to a security feature is "normal," "proper," "sufficient," "natural," or the like if the security feature or environmental condition giving rise to the security feature is related to the creation of a security feature of an anticounterfeiting architecture specified for a legitimate physical document. Likewise, an aspect of a physical document or environmental condition giving rise to a feature of a physical document is "abnormal," "improper," "insufficient" (or lacks sufficiency), "inadequate," or "unnatural," or the like if the feature of the physical document or environmental condition giving rise to the feature of the physical document deviates from a security feature or environmental condition giving rise to the security feature associated with an anticounterfeiting architecture specified for a legitimate physical document.

In the example of FIG. 1, images of the respective physical documents 160A, 160B, 160C can be generated by using a camera to take a picture of each of the physical documents 160A, 160B, 160C. The respective images of the physical documents 160A, 160B, 160C can be uploaded to a server 150 using one or more networks and stored in a database of training images. The database of training images can be used as a data source for training a machine learning model to detect counterfeit physical documents. Though the example of FIG. 1 only shows three images of three different physical documents being uploaded to the server 150, the present disclosure is not so limited. Instead, hundreds of images of physical documents, thousands of images of physical documents, tens of thousands of images of physical documents, hundreds of thousands of images of physical documents, millions of images of physical documents, or even more images of physical documents can be generated or obtained and uploaded to the server 150 for use in training a machine learning model to detect counterfeit physical documents.

Training a Machine Learning Model to Detect Counterfeit Physical Documents

Figure 2:
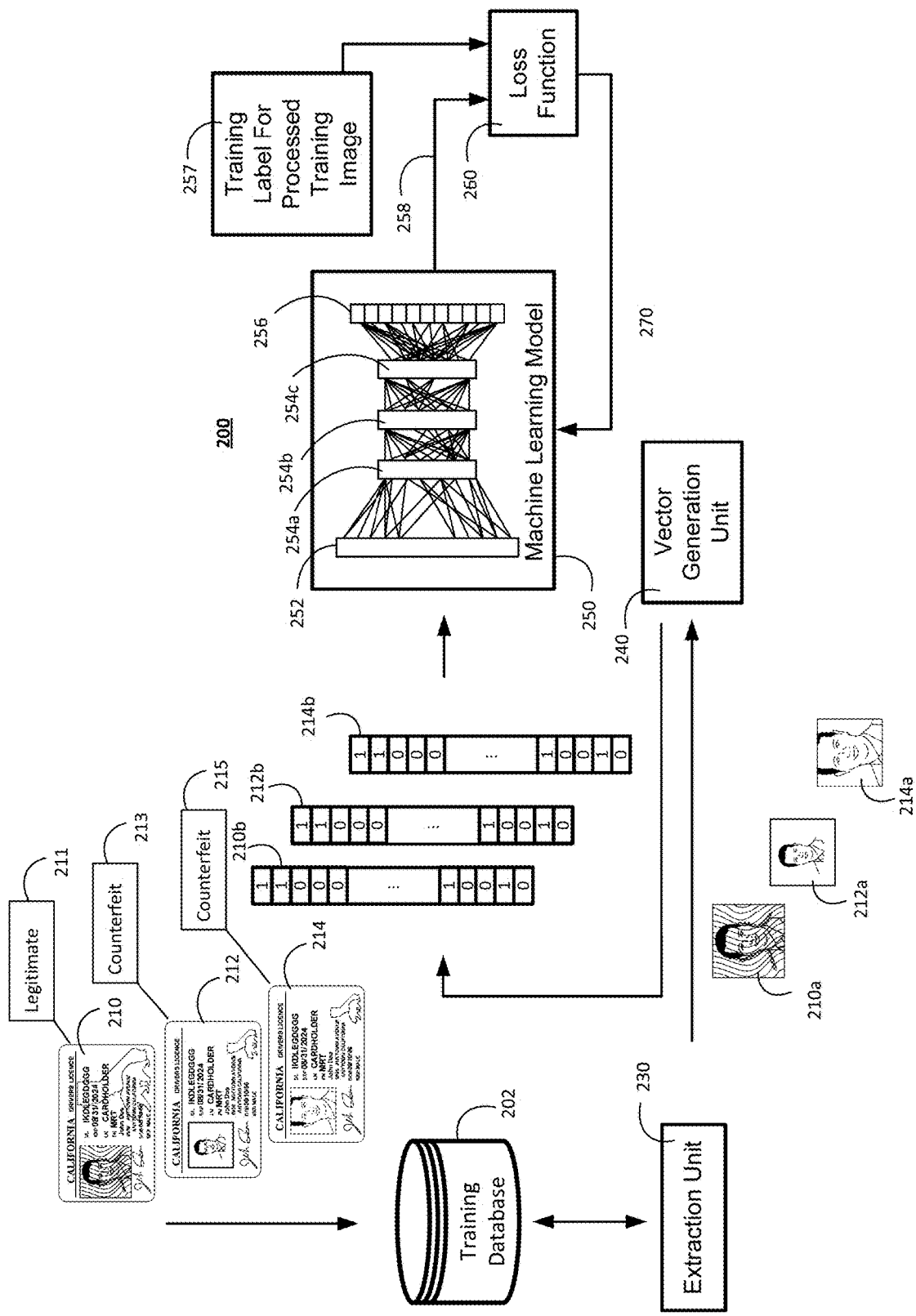
FIG. 2 is a block diagram of an example of a training system for training a machine learning model to detect counterfeit physical documents.

FIG. 2 is a block diagram of an example of a training system 200 for training a machine learning model 250 to detect counterfeit documents. The training system 200 can include a training database 202, an extraction unit 230, a vector generation unit 240, a machine learning model 250, and a loss function 260. Each of the components of training system 200 can be hosted on a single computer or hosted on across multiple computers that are configured to communicate with each other using one or more networks. For purposes of this specification, a "unit" can include software, hardware, or any combination thereof, that is configured to perform the functionality attributed to the "unit" by the present disclosure.

The training system 200 can obtain one or more images 210, 212, 214 of physical documents from one or more data sources and store the obtained images in a training database 202. The data sources can include a digital library of images of physical documents accessible via one or more networks. The data sources can include a device such as a smartphone that captures images of a physical document and transmits the captured image via one or more networks for storage in the training database 202. Other types of data sources can also be a source of images of physical documents such as a flash drive of images of physical documents directly connected to a computer of the training system 200 that hosts the training database 202. The images 210, 212, 214 can include images of legitimate physical documents such as image 210 and images of counterfeit physical documents such as images 212, 214.

Each of the images 210, 212, 214 can be logically related to a respective label 211, 213, 214 that provides an indication of whether the image 210, 212, 214 is an image of a legitimate physical document or a counterfeit physical document. In some implementations, the images 210, 212, 214 may be labeled as an image of a legitimate physical document or an image of a counterfeit physical upon receipt of the image 210, 212, 214 by the training system 200. In other implementations, a human user can review each of the images 210, 212, 214 of physical documents received and stored by the training database 202 and create a label for the image 210, 212, 214. The label can include any type of metadata related to a particular image 210, 212, 214 that indicates whether the particular images 210, 212, 214 is an image of a legitimate physical document or a counterfeit physical document. In the example of FIG. 2, the image 210 is labeled with the label 211 "legitimate," the image 212 is labeled with the label 213 "counterfeit," and the image 214 is labeled with the label 215 "counterfeit."

In some implementations, the label can each be represented as a text value. In other implementations, the labels can each be represented as a numerical value representing the label. For example, the labels can each be implemented as a numerical flag such as a "1" for legitimate or a "0" for counterfeit. In other implementations, the labels can each be implemented as a numerical score that should be produced by the machine learning model 250 as a result of the machine learning model 250 processing the training image logically related to the label. In other implementations, the labels can represent a range of scores that an output generated by a machine learning model 250 should satisfy as a result of the machine learning model 250 processing the training image logically related to the label.

Though the example of FIG. 2 only shows three images 210, 212, 214 of three different physical documents being received by the training database 202, the present disclosure is not so limited. Instead, hundreds of images of physical documents, thousands of images of physical documents, tens of thousands of images of physical documents, hundreds of thousands of images of physical documents, millions of images of physical documents, or even more images of physical documents can be received by the training system 200 for use in training a machine learning model 250 to detect counterfeit documents.

The training system 200 can access the training database 202 to obtain a training image stored in the training database 202 and provide the obtained training image to the extraction unit 230. The extraction unit 230 is configured to identify a particular portion of an image of a physical document that will be used to train the machine learning model 250. In some implementations, the particular portion of the image of the physical document can include a portion of the image of the physical document that corresponds to a facial image or profile image of a person that the physical document identifies. By way of example, the particular portion of an image 210 of a physical document can include the facial image 210a.

In other implementations, the particular portion of the image can include a portion of the image of the physical document that represents the entire portion of the physical document having security features. Assume, e.g., an image of a physical document is generated using a camera of a smartphone, or other device. When using the camera to generate the image, the camera is likely to also capture a portion of the surrounding environment where the physical document existed when the image of the physical document was created by the camera. In such instances, the extraction unit 230 can be configured to extract the portion of the image that represents the physical document and discard the portion of the image that corresponds to the surrounding environment where the physical document existed at the time the image was generate by the camera. An example of a runtime extraction unit that functions in this manner at run time is shown with reference to FIG. 4F.

Accordingly, the portion of the images 210, 212, 214 used by the training system 200 to generate input data for the machine learning model 250 can vary depending upon how the machine learning model 250 is to be trained. In some implementations, the machine learning model 250 can be trained on only facial images 210a, 212a, 214a extracted from images of physical documents 210, 212, 214, respectively. In other implementations, the machine learning model 250 can be trained on images that represent the entirety of the portion of the image that represents the entire physical document, with the entirety of the portion of the image that represents the entire physical document being defined, in some implementations, by the boundaries of the physical document. In other implementations, the entire physical document can include portions of the document that include security features. For purposes of the example of FIG. 2, training the machine learning model 250 is described with reference to the use of extracted portions of the images of physical documents that include facial images or profile images. However, the machine learning model 250 can also be trained in the same manner using any other portion of an image of a physical document that includes security features up to, and potentially including, in some implementations, an image of the entire physical document.

With reference to the example of FIG. 2, the training system 200 can obtain an image 210 of a physical document stored in the training database 202 and provide the image 210 to the extraction unit 230. The image 210 is logically related to label 211 indicating that the image 210 is an image of a legitimate physical document. The extraction unit 230 can extract the facial image 210a from the image 210 and provide the extracted facial image 210a to the vector generation unit 240. The extracted facial image 210a has an anticounterfeiting architecture of a guilloche lines, proper aspect ratio, level focal plane, and a drop shadow.

Vector generation unit 240 can generate data for input to the machine learning model 250. The generated input data can include a vector 210b that numerically represents the extracted facial image 210a. For example, the vector 210b can include a plurality of fields that each correspond to a pixel of the image 210a. The vector generation unit 240 can determine a numerical value for each of the fields that describes the corresponding pixel of the image 210a. The determined numerical values for each of the fields can be used to encode the security features of the anticounterfeiting architecture included in the image 210a into a generated vector 210b. The generated vector 210b, which numerically represents the image 210a, is provided as an input to the machine learning model 250.

The machine learning model 250 can include a deep neural network having an input layer 252 for receiving input data, one or more hidden layers 254a, 254b, 254c for processing the input data received via the input layer 252, and an output layer 256 for providing output data. Each hidden layer 254a, 254b, 254c may include one or more weights or other parameters. The weights or other parameters of each respective hidden layer 254a, 254b, 254c can be adjusted so that the trained deep neural network produces the desired target vector corresponding to each set of training data. The output of each hidden layer 254a, 254b, 254c can include an activation vector. The activation vector output by each respective hidden layer can be propagated through subsequent layers of the deep neural network and used by the output layer to produce output data. For example, the output layer can perform additional computations of a received activation vector from the final hidden layer 254c in order to generate neural network output data 258.

The training system 200 can train the machine learning model 250 to configure one or more of the hidden layers 254a, 254b, 254c to function as a security feature discriminator layer. A security feature discriminator layer can include one or more hidden layers of a deep neural network that have been trained to include security feature discriminators. Each security feature discriminator can be configured to detect the presence or absence of a particular security feature of an anticounterfeiting architecture. The one or more hidden layers 254a, 254b, 254c can be trained to include a security feature discriminator layer using an autoencoding process.

Autoencoding is a training process for generating one or more deep neural network layers that uses a feedback loop for adjusting weights or other parameters of a deep neural network layer until the deep neural network output layer begins to drive deep neural network output data that accurately classifies input data processed by the deep neural network into a particular class specified by the label that corresponds to the image on which the input data is based. The output data presenting a class for the input data can be represented by a similarity score. The output similarity score can be evaluated such as by applying one or more thresholds to the output similarity score to determine a class for the input data. With reference to FIG. 2, the vector 210b that represents the image 210a is input into the input layer 252 of the machine learning model 250, processed through each layer of the machine learning model 250, and output data 258 is generated based on the machine learning model's 250 processing of the vector 210b.

The feedback loop can be implemented by using a loss function 260 that receives, as inputs, the output data 258 generated by the machine learning model 250 and the training label 257 for the particular training image that was processed by the machine learning model 250 to generate the output data 258. In the example of FIG. 2, the inputs to the loss function can be (i) the output data 258 produced by the machine learning model 250 based on the machine learning model's processing of the input data vector 210b that represents the image 210 and (ii) the label 211 that is logically related to the image 210. The training system 200 trains the machine learning model 250 to minimize a loss function 260. The loss function 260 can include any function that depends on the (i) output data 258 generated by the machine learning model 250 by processing a given training image and (ii) the label 257 for the training image that was processed by the machine learning model, which is ultimately the target output that the machine learning model 250 should have generated by processing the training image. In this example, the loss function 260 can, e.g., determine a difference between the output data 258 and the label 211 to determine loss function output data 270 that can be fed back into the machine learning model 250 and used to adjust the values of weights or other parameters of the machine learning model 250 in an effort to drive the machine learning model 250 to produce output data 258 for subsequent training iterations that more closely match the label for the training image processed by the machine learning model to produce output data 258.

The training system 200 can autoencode one or more hidden layers 254a, 254b, 254c as security feature discriminator layers by performing multiple iterations of obtaining a training image from the training database 202, extracting a portion of the training image for use in training the machine learning model 250, generating an input vector based on the extracted portion of the training image, using the machine learning model 250 to process the generated input vector, and execute a loss function 260 that is a function of the output 258 generated by the machine learning model 250 and the label 257 of the training image that corresponds to the training image represented by the input data vector processed by the machine learning model 250 to generate output data 258. The training system 200 can adjust values of parameters of the machine learning model 250 based on outputs 270 of the loss function 260 at each iteration in an effort to minimize the loss function 260 using techniques such as stochastic gradient descent with backpropagation. The iterative adjusting of values of parameters of the machine learning model 250 based on the output 270 of the loss function is a feedback loop that tunes values of weights or other parameters of one or more of the hidden layers 254a, 254b, 254c until the output data 258 begins to match, within a predetermined amount of error, the training label of an image corresponding to the input data vector processed by the machine learning model 250 to produce the output data 258.

To continue performing the autoencoding functions described above on the training images of the example of FIG. 2, the training system 200 can continue to feed training images to the machine learning model 250. After adjusting the values of weights or other parameters of the machine learning model 250 based on the difference between (i) first output data 258 generated by the machine learning model 250 based on the machine learning model's 250 processing of the input data vector 210b and (ii) the label 211, the training system 200 can access a second training image 212.

The training system 200 can provide the training image 212 to the extraction unit 230. The extraction unit 230 is configured to extract the facial image 212a from the training image 212. The extracted facial image 212a does not include security features of an anticounterfeiting architecture of a legitimate physical document because it lacks guilloche lines, a proper aspect ratio, and a drop shadow. The extracted facial image 212a can be provided to the vector generation unit 240. The vector generation unit 240 can generate an input data vector 212b that numerically represents the features of the extracted facial image 212a. The input data vector 212b can be provided into the input layer 252 of the machine learning model 250. The machine learning model 250 can process the input data vector 212b through each layer of the machine learning model 250 to produce output data 258. The output data 258 can then be provided as an input to the loss function 260 along with the label 213 that is logically related to the image 212. The loss function an produce loss function output data 270 that is based on the difference between (i) the output data 258 generated by the machine learning model based on the machine learning model's 250 processing of the input data vector 212b and (ii) the label 213. The training system 200 can then update the values of weights or other parameters of the machine learning model 250 based on the loss function output data 270.

The training system 200 can continue training the machine learning model 250 by accessing another training image 214. The training system 200 can provide the training image 214 to the extraction unit 230. The extraction unit 230 is configured to extract the facial image 214a from the training image 214. The extracted facial image 214a does not include security features of an anticounterfeiting architecture of a legitimate document because it lacks a guilloche lines, a proper aspect ratio, and a drop shadow. The extracted facial image 214a can be provided to the vector generation unit 240. The vector generation unit 240 can generate an input data vector 214b that numerically represents the features of the extracted facial image 214a. The input data vector 214b can be provided into the input layer 252 of the machine learning model 250. The machine learning model 250 can process the input data vector 214b through each layer of the machine learning model 250 to produce output data 258. The output data 258 can then be provided as an input to the loss function 260 along with the label 215 that is logically related to the image 214. The loss function can produce loss function output data 270 that is based on the difference between (i) the output data 258 generated by the machine learning model based on the machine learning model's 250 processing of the input data vector 214b and (ii) the label 215. The training system 200 can then update the values of weights or other parameters of the machine learning model 250 based on the loss function output data 270.

In some implementations, the training system 200 can continue to perform subsequent iterations of training the machine learning model 250 in the same manner described above with reference to images 210, 212, 214 until each of a plurality of training images of physical documents stored in the training database 202 have been used to train the machine learning model 250. In other implementations, the training system 200 can continue to perform subsequent iterations of training the machine learning model 250 until training system 200 determines that the output data 258 generated by the machine learning model 250 based on the machine learning model's 250 processing of particular training images is determined to consistently match a corresponding label of the processed training images within a predetermined amount of error.

FIG. 3 is flowchart of an example of a training process 300 for training a machine learning model to detect physical counterfeit documents. In general, the training process 300 can include obtaining a training image, from a database of training images, that has been labeled as being (i) an image of a legitimate physical document or (ii) an image of a counterfeit document (310), extracting a portion of the training image of a physical document (320), generating an input data vector that encodes features of the extracted portion of the training image of the physical document into a numerical representation of the extracted portion of the training image of the physical document (330), providing the generated input data vector representing the extracted portion of the training image of the physical document as in input to a machine learning model (340), obtaining output data generated by the machine learning model based on the machine learning model's processing of the input data vector representing the extracted portion of the training image of the physical document, with the output data including a similarity score indicating a likelihood that the image of the physical document represented by the generated input data vector is a counterfeit document (350), determining an amount of error that exists between the obtained output data and the label for the obtained training image (360), and adjusting the one or more parameters of the machine learning model based on the determined error (370).

The training process 300 can continue by determining whether the determined error satisfies a predetermined threshold (380). If the determined error satisfies a predetermined threshold, then the training process 300 can terminate at 395. Alternatively, if the determined error does not satisfy a predetermined threshold, then the training process can continue at stage 390 by determining whether there is an additional training image of a physical document to be processed (390). If there is an additional training image of a physical document to be processed, then the training process can continue at stage 310 by obtaining a training image of a physical document that has been labeled as being (i) an image of a legitimate physical document or (ii) an image of a counterfeit document (310). The training process 300 can then continue until one of the two terminations conditions 380, 390 are met. Once one of the two termination conditions are met, the training process 300 terminates.

Runtime Implementation of a Trained Model For Detecting Counterfeit Physical Documents FIG. 4A is an example of a runtime system 400A that determines whether a physical document is a counterfeit physical document using a machine learning model 450 that is trained to detect counterfeit physical documents. The runtime system 400A includes a device 405, an extraction unit 430, a vector generation unit 440, a trained machine learning model 450, and an output evaluation unit 460. In some implementations, the runtime system 400A can be implemented across multiple computers, with the device 405 being configured to communicate, using one or more networks, with one or more other computers hosting the other components of the system 400A. Alternatively, the components of the runtime system 400A can all be implemented within the device 405, with even the machine learning model 450 being hosted on the device 405.

In some implementations, the physical document 410 can be presented, by a person, at an entrance to an establishment that serves alcoholic drinks in a first state such as Virginia. An employee of the establishment, or other user, could use the runtime system 400A to determine whether the physical document 410 is a counterfeit physical document. In this scenario, the physical document 410 lacks security features such as a drop shadow in locations 414a, 414b, guilloches lines across the facial image 412, has a facial image that has an improper aspect ratio (e.g., face is too big), and has improperly sized graphics 416. However, the physical document purports to be a physical document issued by another state such as California. As a result, the employee of Virginia may not spot the lack of security features in an out-of-state physical document that the Virginia employee rarely sees.

The employee, or other user, can use a device 405 that is configured to obtain first data representing an image of the physical document 410. For example, the device 405 such as a smartphone can include a camera 408 that is used to generate an image 420 of a physical document 410. In some implementations, the image 420 can depict a first portion 420a that includes an image of the physical document 410 and a second portion 420b that includes an image of a portion of the surrounding environment when the image of the physical document 410 was captured. Though the example of system 400A depicts a device 405 in the form of a smartphone to generate an image 420 of the physical document 410, the present disclosure is not so limited. Instead, any device that includes a digital camera can be used as the device 405 to generate an image of the physical document 410. Other examples can include a tablet with a camera and network interface, a webcam coupled to a desktop computer or laptop computer having a network interface, a dedicated hand-held scanner with a camera and network interface, a security camera with a network interface, or the like.

In some implementations, the device 405 can transmit the generated image 420 of the physical document 410, across one or more networks, to one or more remote computers that host the remaining components of runtime system 400A. In other implementations, the device 405 can transmit the image 420 of the physical document 410, via one or more direct connections, to one or more other computers that host the remaining components of runtime system 400A. In other implementations, the device 405 can host, locally, the remaining components of runtime system 400A. In either scenario, employee, or other user, can use device 405 to provide the image 420, of the physical document 410 that is generated by the camera 408, to an extraction unit 430.

In the example of FIG. 4A, the extraction unit 430 is configured to identify a particular portion of an image 420 of a physical document 410 that corresponds to a facial image or profile image of a person that the physical document identifies. The extraction unit 430 is configured to identify this particular portion of the image 420 because the machine learning model 450 includes one or more security feature discriminator layers 454a, 454b, 454c that have been trained to detect the presence or absence of security features in a facial image using the process described with respect to FIGS. 2 and 3. Accordingly, in this example, the extraction unit 430 can extract the portion of image 420 that corresponds to the facial image of the physical document 410. The extracted image portion 435 is output by the extraction unit 430. As shown in FIG. 4A, the extracted image portion 435 does not include security features such as a drop shadow at locations 414a, 414b or guilloche lines across the facial image. In addition, FIG. 4A shows that the extracted image portion 435 includes an improper facial aspect ratio.

The runtime system 400A can provide the extracted image portion 435 to the vector generation unit 440. The vector generation unit 440 can generate input data that represents the extracted image portion 435 for input to the machine learning model 450 that has been trained to include one or more trained security feature discriminator layers for detecting the presence or absence of security features in a vector representing a facial image of a physical document. The generated input data can include a vector 445 that numerically represents the extracted image portion 435. For example, the vector 445 can include a plurality of fields that each correspond to a pixel of the image 435. The vector generation unit 440 can determine a numerical value for each of the fields that describes the corresponding pixel of the image 435. The determined numerical values for each of the fields can be used to encode data describing features of the extracted image portion 435 into a generated vector 445. The generated vector 445, which numerically represents the extracted image portion 435, is provided to an input layer 452 of the trained machine learning model 450. The trained machine learning model 450 can include, for example, a deep neural network.

The trained machine learning model 450 can process the generated input vector 445 through one or more security feature discriminator layers 454a, 454b, 454c. Each of the one or more security feature discriminator layers 454a, 454b, 454c can include one or more security feature discriminators that have been trained, using the processes described with respect to FIGS. 2 and 3, to detect the presence or absence of particular security features. By way of example, the one or more security feature discriminator layers 454a, 454b, 454c can include security feature discriminators trained to detect an absence of a security feature where it should exist, presence of a security feature where it should not exist, incorrect security features, abnormal security features, natural background, artificial background, natural lighting, artificial lighting, natural shadow, artificial shadow, absence of flash shadow such as a drop shadow, head size abnormalities, head aspect ratio abnormalities, head translation abnormalities, abnormal color temperatures, abnormal coloration, aligned and configured flash lighting, off-angle illumination, focal plan abnormalities, bisection of a focal plane, use of fixed focal length lenses, imaging effects related to requantization, imaging effects related to compression, abnormal head tilt, abnormal head pose, abnormal head rotation, non-frontal facial effects, presence of facial occlusions such as glasses, hats, head scarfs, or other coverage, abnormal head shape dynamics, abnormal head aspect ratio to intereye distances, abnormal exposure compensation between foreground and background, abnormal focus effects, image stitching effects indicating different digital sources, improper biometric security feature printing, improper security feature layering such as improper OVD, OVI, hologram, other secondary security feature overlays over a face or other portion of a document, improper tactile security feature placement near face, over a face, or other portion of a document, improper final face print, improper laser black and white, improper color laser, improper layered ink print, improper printing techniques, improper print layer sequencing, or the like.

The trained machine learning model 450 processes the generated input vector 445 through each of the one or more security feature discriminator layers and then propagates the resulting activation vector output by the last of the one or more security feature discriminator layers through the remaining layers of the trained machine learning model 450. An output layer 456 of the trained machine learning model 450 can calculate output data 455 such as a similarity score that is based on the activation vectors output by the last of the one or more security feature discriminator layers. The runtime system 400A can obtain the calculated output data 455 generated by the trained machine learning model 450 based on the trained machine learning model's 450 processing of the generated input vector 445 and provide the output data 455 to an output evaluation unit 460.

The output evaluation unit 460 can be configured to determine a likelihood that the physical document 410 that included facial image depicted by the extracted image portion 435 is a counterfeit physical document. The output evaluation unit 460 can make this determination based on the output data 455 generated by the trained machine learning model 450 based on the trained machine learning model's 450 processing of the generated input vector 445. For example, the output evaluation unit can apply output data 455 such as a similarity score to a predetermined threshold. The similarity score can provide a degree to which the extracted image portion 435 represented by the input vector 445 deviates from a facial image of a legitimate physical document having a legitimate anticounterfeiting architecture upon which the machine learning model 450 was trained. If the output evaluation unit 460 determines that the output data 455 satisfies the predetermined threshold, then the output evaluation unit 460 can determine that the physical document 410 that included a facial image corresponding to the extracted image portion 435, which was represented by the input vector 445, is a counterfeit physical document. Alternatively, if the output evaluation unit 460 determines that the output data 455 does not satisfy the predetermined threshold, then the output evaluation unit 460 can determine that the physical document 410 that included the facial image corresponding to the extracted image portion 435, which was represented by the input vector 445, is a legitimate physical document. For purposes of this specification, "satisfying a threshold" can include a value that exceeds the threshold or does not exceed the threshold. Similarly, "not satisfying a threshold" can include a value that does the opposite of "satisfying a threshold." Accordingly, if a value that exceeds the threshold satisfies the threshold, then a value that does not exceed the threshold does not satisfy the threshold. Alternatively, if a value that does not exceed the threshold satisfies the threshold, then a value that exceeds the threshold does not satisfy the threshold.

In this example of FIG. 4A, the one or more trained security feature discriminator layers can detect the absence of security features such as drop shadows and guilloche lines in the extracted image portion 435. In addition, one or more of the trained security feature discriminator layers can detect the presence of a facial image having an improper facial aspect ratio. In such scenario, the machine learning model 450 is trained to generate output data 455 such as a similarity score that satisfies a predetermined threshold score, thereby indicating that the extracted image portion 435 deviates from legitimate facial images of a legitimate physical document having an anticounterfeiting architecture upon which the machine learning model 450 was trained. The output evaluation unit 460, or other component of a computer system implementing the runtime system 400A can generate an output alert that is transmitted back to the device 405 to alert the employee, or other user, that the physical document 410 is a counterfeit physical document.

In this example, an alert was generated in memory of computer of the computer system implementing runtime system 400A and then transmitted to the device 405 in response to determining that the physical document 410 is a counterfeit document. First, it should be noted that generating the alert in memory of the computer of the computer system implementing runtime system 400A includes storing data in memory representing the alert. However, it is also noted that there is no requirement that an alert be transmitted. For example, the runtime system 400A can merely store data indicating the result of the processing of an image of physical document by the runtime system 400A. In such implementations, the runtime system 400A can merely store data indicating whether the processed image is counterfeit or legitimate.

FIG. 4B is another example of a runtime system 400B that determines whether a physical document is a counterfeit physical document using a machine learning model 450 that is trained to detect counterfeit physical documents. The runtime system 400B is the same as the runtime system 400A, as the runtime system 400B includes a device 405, an extraction unit 430, a vector generation unit 440, a trained machine learning model 450, and an output evaluation unit 460. In some implementations, the runtime system 400B can be implemented across multiple computers, with the device 405 being configured to communicate, using one or more networks, with one or more other computers hosting the other components of the system 400B. Alternatively, the components of the runtime system 400B can all be implemented within the device 405, with even the machine learning model 450 being hosted on the device 405.

In one implementation, a physical document 1410 can be presented, by a different person, at an entrance to an establishment that serves alcoholic drinks in a first state such as Florida. An employee of the establishment, or other user, could use the runtime system 400B to determine whether the physical document 1410 is a counterfeit document. In this scenario, the physical document includes each of the security features of a legitimate anticounterfeiting architecture upon which the machine learning model 450 was trained. The security features of the legitimate anticounterfeiting architecture include a drop shadow 1414a, 1414b, guilloche lines 1418 across the facial image 1412, has a facial image with a proper aspect ratio, and had a properly sized graphic 1416. Nonetheless, the employee can still take necessary steps to use runtime system 400B to verify that the physical document 1410 is a legitimate physical document.

The employee, or other user, can use a device 405 that is configured to obtain first data representing an image of the physical document 1410. For example, the device 405 such as a smartphone can include a camera 408 that is used to generate an image 1420 of a physical document 1410. In some implementations, the image 1420 can depict a first portion 1420a that includes an image of the physical document 1410 and a second portion 1420b that includes an image of a portion of the surrounding environment when the image of the physical document 1410 was captured. Though the example of system 400B depicts a device 405 in the form of a smartphone to generate an image 1420 of the physical document 1410, the present disclosure is not so limited. Instead, any device that includes a digital camera can be used as the device 405 to generate an image of the physical document 1410. Other examples can include a tablet with camera and network interface, a webcam coupled to desktop computer or laptop computer having a network interface, a dedicated hand-held scanner with a camera and network interface, a security camera with a network interface, or the like.

In some implementations, the device 405 can transmit the image 1420 of the physical document 1410, across one or more networks, to one or more remote computers that host the remaining components of runtime system 400B. In other implementations, the device 405 can transmit the image 1420 of the physical document 1410, via one or more direct connections, to one or more other computers that host the remaining components of runtime system 400A. In other implementations, the device 405 can host, locally, the remaining components of runtime system 400A. In either scenario, employee, or other user, can use device 405 to provide the image 1420, of the physical document 1410 that is generated by the camera 408, to an extraction unit 430.

In the example of FIG. 4B, the extraction unit 430 is configured to identify a particular portion of an image 1420 of a physical document 1410 that corresponds to a facial image or profile image of a person that the physical document identifies. The extraction unit 430 is configured to identify this particular portion of the image 1420 because the machine learning model 450 includes one or more security feature discriminator layers 454a, 454b, 454c that have been trained to detect the presence or absence of security features in a facial image using the process described with respect to FIGS. 2 and 3. Accordingly, in this example, the extraction unit 430 can extract the portion of image 1420 that corresponds to the facial image 1412 of the physical document 1410. The extracted image portion 1435 is output by the extraction unit 430. As shown in FIG. 4B, the extracted image portion 1435 includes a drop shadow 1414a, 1414b, guilloches lines 1418 across the facial image, and has a facial image with a proper aspect ratio.

The runtime system 400B can provide the extracted image portion 1435 to the vector generation unit 440. The vector generation unit 440 can generate input data that represents the extracted image portion 1435 for input to the machine learning model 450 that have been trained to include one or more trained security feature discriminator layers for detecting the presence or absence of security features in a vector representing a facial image from a physical document. The generated input data can include a vector 1445 that numerically represents the extracted image portion 1435. For example, the vector 1445 can include a plurality of fields that each correspond to a pixel of the image 1435. The vector generation unit 440 can determine a numerical value for each of the fields that describes the corresponding pixel of the image 1435. The determined numerical values for each of the fields can be used to encode data describing features of the extracted image portion 1435 into a generated vector 1445. The generated vector 1445, which numerically represents the extracted image portion 1435, is provided to an input layer 452 of the trained machine learning model 450. The trained machine learning model 450 can include, for example, a deep neural network.

The trained machine learning model 450 can process the generated input vector 1445 through one or more security feature discriminator layers 454a, 454b, 454c. Each of the one or more security feature discriminator layers 454a, 454b, 454c can include one or more security feature discriminators that have been trained, using the processes described with respect to FIGS. 2 and 3, to detect the presence or absence of particular security features. By way of example, the one or more security feature discriminator layers 454a, 454b, 454c can include security feature discriminators trained to detect an absence of a security feature where it should exist, presence of a security feature where it should not exist, incorrect security features, abnormal security features, natural background, artificial background, natural lighting, artificial lighting, natural shadow, artificial shadow, absence of flash shadow such as a drop shadow, head size abnormalities, head aspect ratio abnormalities, head translation abnormalities, abnormal color temperatures, abnormal coloration, aligned and configured flash lighting, off-angle illumination, focal plan abnormalities, bisection of a focal plane, use of fixed focal length lenses, imaging effects related to requanitization, imaging effects related to compression, abnormal head tilt, abnormal head pose, abnormal head rotation, non-frontal facial effects, presence of facial occlusions such as glasses, hats, head scarfs, or other coverage, abnormal head shape dynamics, abnormal head aspect ratio to intereye distances, abnormal exposure compensation between foreground and background, abnormal focus effects, image stitching effects indicating different digital sources, improper biometric security feature printing, improper security feature layering such as improper OVD, OVI, hologram, other secondary security feature overlays over a face or other portion of a document, improper tactile security feature placement near face, over a face, or other portion of a document, improper final face print, improper laser black and white, improper color laser, improper layered ink print, improper printing techniques, improper print layer sequencing, or the like.

The trained machine learning model 450 processes the generated input vector 1445 through each of the one or more security feature discriminator layers 454a, 454b, 454c and then propagates the resulting activation vector output by the last of the one or more security feature discriminator layers through the remaining layers of the trained machine learning model 450. An output layer 456 of the trained machine learning model 450 can calculate output data 1455 such as a similarity score that is based on the activation vectors output by the last of the one or more security feature discriminator layers. The runtime system 400B can obtain the calculated output data 1455 generated by the trained machine learning model 450 based on the trained machine learning model's 450 processing of the generated input vector 1445 and provide the output data 1455 to an output evaluation unit 460.

The output evaluation unit 460 can be configured to determine a likelihood that the physical document 1410 that included a facial image depicted by the extracted image portion 1435 is a counterfeit physical document. The output evaluation unit 460 can make this determination based on the output data 1455 generated by the trained machine learning model 450 based on the trained machine learning model's 450 processing of the generated input vector 1445. For example, the output evaluation unit can apply output data 1455 such as a similarity score to a predetermined threshold. The similarity score can provide a degree to which the extracted image portion 1435 represented by the input vector 1445 deviates from a facial image of a legitimate physical document having a legitimate anticounterfeiting architecture upon which the machine learning model 450 was trained. If the output evaluation unit 460 determines that the output data 1455 satisfies the predetermined threshold, then the output evaluation unit 460 can determine that the physical document 1410 that included a facial image corresponding to the extracted image portion 1435, which was represented by the input vector 1445, is a counterfeit physical document. Alternatively, if the output evaluation unit 460 determines that the output data 1455 does not satisfy the predetermined threshold, then the output evaluation unit 460 can determine that the physical document 1410 that included the facial image corresponding to the extracted image portion 1435, which was represented by the input vector 4145, is a legitimate physical document.

In this example of FIG. 4B, the one or more trained security feature discriminator layers can detect the drop shadow 1414a, 1414b, guilloche lines 1418 across the facial image, and proper facial image aspect ratio. In such scenario, the machine learning model 450 is trained to generate output data 1455 such as similarity score that does not satisfy a predetermined threshold score, thereby indicating that the extracted image portion 1435 does not deviate from legitimate facial images of a legitimate physical document having an anticounterfeiting architecture upon which the machine learning model 450 was trained. The output evaluation unit 460, or other component of a computer system implementing the runtime system 400B can generate an output alert that is transmitted back to the device 405 to alert the employee, or other user, that the physical document 1410 is a legitimate physical document.

Figure 4C:
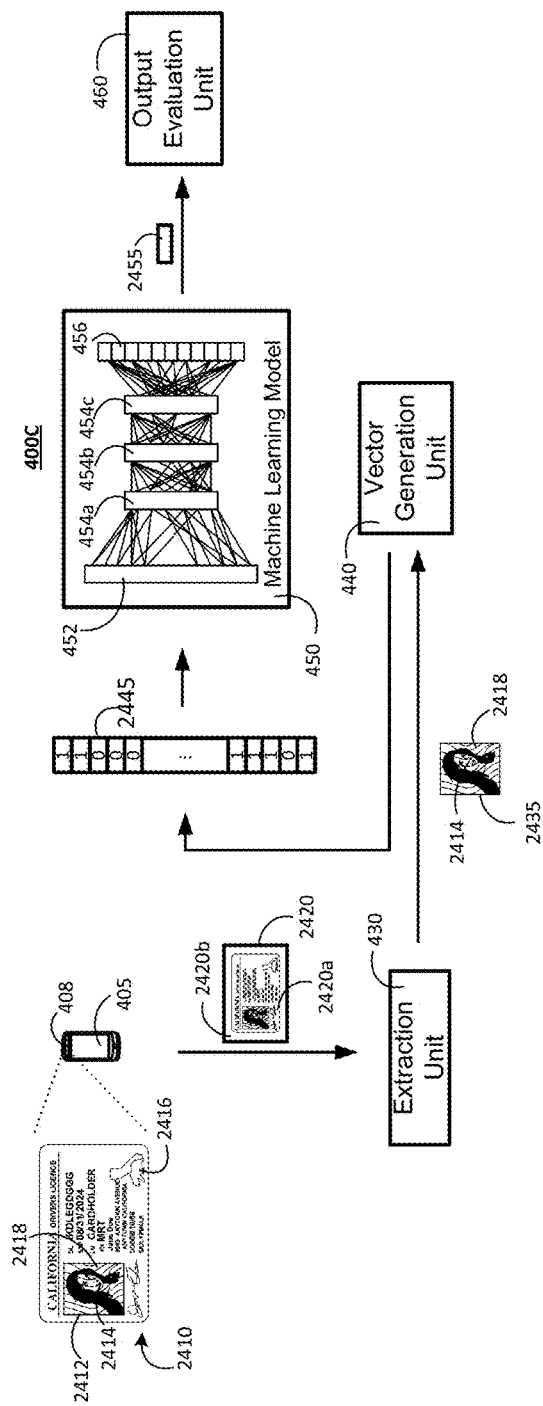
FIG. 4C is another example of a runtime system that determines whether a physical document is a counterfeit physical document using a machine learning model that is trained to detect counterfeit physical documents.

FIG. 4C is another example of a runtime system that determines whether a physical document is a counterfeit physical document using a machine learning model that is trained to detect counterfeit physical documents. The runtime system 400C is the same as the runtime system 400A, as the runtime system 400C includes a device 405, an extraction unit 430, a vector generation unit 440, a trained machine learning model 450, and an output evaluation unit 460. In some implementations, the runtime system 400C can be implemented across multiple computers, with the device 405 being configured to communicate, using one or more networks, with one or more other computers hosting the other components of the system 400C. Alternatively, the components of the runtime system 400C can all be implemented within the device 405, with even the machine learning model 450 being hosted on the device 405.

In one implementation, a physical document 2410 can be presented, by a different person than in the example of FIGS. 4A and 4B, to a police officer during a traffic stop. The police officer could use the runtime system 400C to determine whether the physical document 2410 is a counterfeit physical document. In this scenario, the physical document 2410 lacks one or more security features of a legitimate anticounterfeiting architecture used to train the machine learning model 450. Specifically, though the physical document 2410 includes guilloche lines 2418 and a proper facial aspect ratio, the facial image 2412 includes an abnormal head tilt 2414 and the physical document 1410 includes an improperly sized graphic 2416. Because of the person's long hair, the presence or absence of a drop shadow can be inconclusive. The police officer can use runtime system 400C to determine whether the physical document 2410 is a legitimate physical document.

The police officer can use a mobile device 405 such as a smartphone to generate an image 2420 of the physical document 2410. The image 2420 depicts a first portion of the image 2420a of the physical document 2410 and a second portion of the image 2420b that may include a portion of the surrounding environment when the image 2420 of the physical document 2410 was captured. The mobile device 405 can provide the generated image 2420 to an extraction unit 460.

In the example of FIG. 4C, the extraction unit 430 is configured to identify a particular portion of an image 2420 of a physical document 2410 that corresponds to a facial image or profile image of a person that the physical document identifies. The extraction unit 430 is configured to identify this particular portion of the image 2420 because the machine learning model 450 includes one or more security feature discriminator layers 454a, 454b, 454c that have been trained to detect the presence or absence of security features in a facial image using the process described with respect to FIGS. 2 and 3. Accordingly, in this example, the extraction unit 430 can extract the portion of image 2420 that corresponds to the facial image 2412 of the physical document 2410. The extracted image portion 2435 is output by the extraction unit 430. As shown in FIG. 4C, the extracted image portion 2435 includes an abnormal head tilt. In addition, the extracted image portion 2435 also includes security features such as guilloches lines 2418 across the facial image and a proper facial aspect ratio.

The runtime system 400C can provide the extracted image portion 2435 to the vector generation unit 440. The vector generation unit 440 can generate input data that represents the extracted image portion 2435 for input to the machine learning model 450 that has been trained to include one or more trained security feature discriminator layers for detecting the presence or absence of security features in a vector representing a facial image from a physical document. The generated input data can include a vector 2445 that numerically represents the extracted image portion 2435. For example, the vector 2445 can include a plurality of fields that each correspond to a pixel of the image 2435. The vector generation unit 440 can determine a numerical value for each of the fields that describes the corresponding pixel of the image 2435. The determined numerical values for each of the fields can be used to encode data describing features of the extracted image portion 2435 into a generated vector 2445. The generated vector 2445, which numerically represents the extracted image portion 2435, is provided to an input layer 452 of the trained machine learning model 450. The trained machine learning model 450 can include, for example, a deep neural network.

The trained machine learning model 450 processes the generated input vector 2445 through each of the one or more security feature discriminator layers 454a, 454b, 454c and then propagates the resulting activation vector output by the last of the one or more security feature discriminator layers through the remaining layers of the trained machine learning model 450. An output layer 456 of the trained machine learning model 450 can calculate output data 2455 such as a similarity score that is based on the activation vectors output by the last of the one or more security feature discriminator layers. The runtime system 400C can obtain the calculated output data 2455 generated by the trained machine learning model 450 based on the trained machine learning model's 450 processing of the generated input vector 2445 and provide the output data 2455 to an output evaluation unit 460.

In this example of FIG. 4C, the one or more trained security feature discriminator layers can detect the presence of security features such as guilloche lines 2418 and a proper facial aspect ratio. However, the one or more trained security feature discriminator layers can also detect the presence of an abnormal head tilt 2414 in the extracted image portion 2435. In such scenario, the machine learning model 450 is trained to generate output data 2455 such as similarity score that satisfies a predetermined threshold score, thereby indicating that the extracted image portion 2435 deviates from legitimate facial images of a legitimate physical document having an anticounterfeiting architecture upon which the machine learning model 450 was trained. The output evaluation unit 460, or other component of a computer system implementing the runtime system 400C can generate an output alert that is transmitted back to the device 405 to alert the police officer that the physical document 2410 is a counterfeit physical document.

Figure 4D:
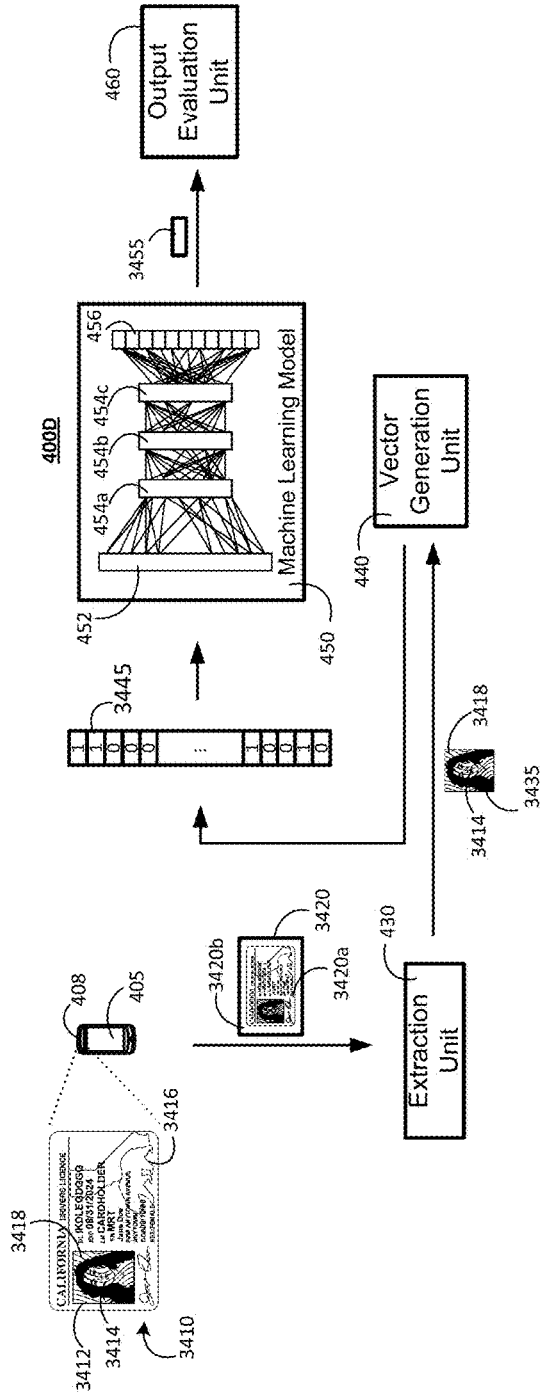
FIG. 4D is another example of a runtime system that determines whether a physical document is a counterfeit physical document using a machine learning model that is trained to detect counterfeit physical documents.

FIG. 4D is another example of a runtime system 400D that determines whether a physical document is a counterfeit physical document using a machine learning model that is trained to detect counterfeit physical documents. The runtime system 400D is the same as the runtime system 400A, as the runtime system 400D includes a device 405, an extraction unit 430, a vector generation unit 440, a trained machine learning model 450, and an output evaluation unit 460. In some implementations, the runtime system 400D can be implemented across multiple computers, with the device 405 being configured to communicate, using one or more networks, with one or more other computers hosting the other components of the system 400D. Alternatively, the components of the runtime system 400D can all be implemented within the device 405, with even the machine learning model 450 being hosted on the device 405.

In one implementation, a physical document 3410 can be presented, by a different person than in the example of FIGS. 4A and 4B, to a police officer during a traffic stop. The police officer could use the runtime system 400D to determine whether the physical document 3410 is a counterfeit document. In this scenario, the physical document 3410 includes each of the security features of a legitimate anticounterfeiting architecture upon which the machine learning model 450 was trained. The security features of the legitimate anticounterfeiting architecture include guilloches lines 3418 across the facial image 3412, a facial image 3412 with a proper aspect ratio, a facial image 3412 with a normal head orientation 3414, and a properly sized graphic 1416. Nonetheless, the police officer can still take necessary steps to use runtime system 400D to verify that the physical document 3410 is a legitimate physical document.

The police officer can use a mobile device 405 such as a smartphone to generate an image 3420 of the physical document 3410. In some implementations, the image 3420 can depict a first portion 3420a that includes an image of the physical document 3410 and a second portion 3420b that includes an image of a portion of the surrounding environment when the image of the physical document 3410 was captured. The mobile device 405 can provide the generated image 3420 to an extraction unit 460.

In the example of FIG. 4D, the extraction unit 430 is configured to identify a particular portion of an image 3420 of a physical document 3410 that corresponds to a facial image or profile image of a person that the physical document identifies. The extraction unit 430 is configured to identify this particular portion of the image 3420 because the machine learning model 450 includes one or more security feature discriminator layers 454a, 454b, 454c that have been trained to detect the presence or absence of security features in a facial image using the process described with respect to FIGS. 2 and 3. Accordingly, in this example, the extraction unit 430 can extract the portion of image 3420 that corresponds to the facial image 3412 of the physical document 3410. The extracted image portion 3435 is output by the extraction unit 430. As shown in FIG. 4D, the extracted image portion 3435 includes guilloches lines 3418 across the facial image 3412, a facial image with a normal head orientation 3414, and a facial image with proper aspect ratio.

The runtime system 400D can provide the extracted image portion 3435 to the vector generation unit 440. The vector generation unit 440 can generate input data that represents the extracted image portion 3435 for input to the machine learning model 450 that has been trained to include one or more trained security feature discriminator layers for detecting the presence or absence of security features in a vector representing a facial image from a physical document. The generated input data can include a vector 3445 that numerically represents the extracted image portion 3435. For example, the vector 3445 can include a plurality of fields that each correspond to a pixel of the image 3435. The vector generation unit 440 can determine a numerical value for each of the fields that describes the corresponding pixels of the image 3435. The determined numerical values for each of the fields can be used to encode data describing features of the extracted image portion 3435 into a generated vector 3445. The generated vector 3445, which numerically represents the extracted image portion 3435, is provided to an input layer 452 of the trained machine learning model 450. The trained machine learning model 450 can include, for example, a deep neural network.

The trained machine learning model 450 processes the generated input vector 3445 through each of the one or more security feature discriminator layers 454a, 454b, 454c and then propagates the resulting activation vector output by the last of the one or more security feature discriminator layers through the remaining layers of the trained machine learning model 450. An output layer 456 of the trained machine learning model 450 can calculate output data 3455 such as a similarity score that is based on the activation vectors output by the last of the one or more security feature discriminator layers. The runtime system 400D can obtain the calculated output data 3455 generated by the trained machine learning model 450 based on the trained machine learning model's 450 processing of the generated input vector 3445 and provide the output data 3455 to an output evaluation unit 460.

In this example of FIG. 4D, the one or more trained security feature discriminator layers can detect security features of the extracted image portion 3435 that include guilloches lines 3418 across the extracted image portion 3435, a facial image with a proper aspect ratio, and a facial image with a normal head orientation 3414. In such a scenario, the machine learning model 450 is trained to generate output data 3455 such as similarity score that does not satisfy a predetermined threshold score, thereby indicating that the extracted image portion 3435 does not deviate from legitimate facial images of a legitimate physical document having an anticounterfeiting architecture upon which the machine learning model 450 was trained. The output evaluation unit 460, or other component of a computer system implementing the runtime system 400D can generate an output alert that is transmitted back to the device 405 to alert the police officer that the physical document 3410 is a legitimate physical document.

FIG. 4E is another example of a runtime system 400E that determines whether a physical document is a counterfeit physical document using a machine learning model that is trained to detect counterfeit physical documents. The runtime system 400E is similar to the runtime system 400A, as the runtime system 400E includes a device 405, an extraction unit 1430, a vector generation unit 440, a trained machine learning model 1450, and an output evaluation unit 460. In some implementations, the runtime system 400E can be implemented across multiple computers, with the device 405 being configured to communicate, using one or more networks, with one or more other computers hosting the other components of the system 400E. Alternatively, the components of the runtime system 400E can all be implemented within the device 405, with even the machine learning model 1450 being hosted on the device 405.

However, the runtime system 400E differs from the runtime system 400A because the trained machine learning model 1450 of FIG. 4E has trained to include one or more security feature discriminator layers that are trained to detect the presence or absence of security features of an anticounterfeiting architecture in an image of an entire physical document. In contrast, the machine learning model 450 of FIG. 4A has one or more security feature discriminator layers that have been trained to detect the presence or absence of security features of an anticounterfeiting architecture in a portion of an image of a physical document that depicts a facial image that appears in the physical document.

In addition, the extraction unit 1430 differs from extraction unit 430 of FIG. 4A because the extraction unit 1430 is configured to extract an image of an entire physical document from an image for input into the trained machine learning model 1450. In contrast, the extraction unit 430 of FIG. 4A is configured to extract facial images from an image of a physical document.

In one implementation, a physical document 4410 can be presented, by a person, to a TSA officer in an airport security line. The TSA officer could use the runtime system 400E to determine whether the physical document 4410 is a counterfeit physical document. In this scenario, the physical document 4410 lacks one or more security features of a legitimate anticounterfeiting architecture used to train the machine learning model 450. Specifically, the physical document 4410 does not include guilloche lines, does not include a drop shadow in the locations 4414a, 4414b, has a facial image 4412 with an increased aspect ratio, and includes an improperly sized graphic 4416. However, the TSA office may not be aware that such features are indicative of a counterfeit physical document. Before letting the person pass through security, the TSA officer can use runtime system 400E to determine whether the physical document 4410 is a legitimate physical document.

The TSA officer can use a mobile device 405 such as a smartphone to generate an image 4420 of the physical document 4410. In some implementations, the image 4420 can depict a first portion 4420a that includes an image of the physical document 4410 and a second portion 4420b that includes an image of a portion of the surrounding environment when the image of the physical document 4410 was captured. The mobile device 405 can provide the generated image 4420 to an extraction unit 1430.

In the example of FIG. 4E, the extraction unit 1430 is configured to identify a particular portion of an image 4420 of a physical document 4410 that corresponds to the portion of the image 4420a depicting the entirety of the physical document 4410. The extraction unit 1430 is configured to identify the portion 4420a of the image 4420 because the machine learning model 1450 includes one or more security feature discriminator layers 1454a, 1454b, 1454c that have been trained to detect the presence or absence of security features in an image of an entire physical document. Accordingly, in this example, the extraction unit 1430 can be configured to identify the boundaries between portion 4420a and 4420b of the image 4420 and extract the portion 4420a from the image 4420. In such implementations, the extraction unit 1430 can discard the portion 4420b so that only an extracted image portion 4435 remains, which corresponds to an image of the physical document 4410. The extracted image portion 4435 is output by the extraction unit 1430. As shown in FIG. 4E, the extracted image portion 4435 does not have a drop shadow at locations 4414a, 4414b, does not have guilloche lines, has a facial image having an increased facial aspect ratio, and has a graphic 4416 that is too small.

The runtime system 400E can provide the extracted image portion 4435 to the vector generation unit 440. The vector generation unit 440 can generate input data that represents the extracted image portion 4435 for input to the machine learning model 1450 that has been trained to include one or more trained security feature discriminator layers for detecting the presence or absence of security features of a vector representing an image of an entire physical document. The generated input data can include a vector 4445 that numerically represents the extracted image portion 4435. For example, the vector 4445 can include a plurality of fields that each correspond to a pixel of the image 4435. The vector generation unit 440 can determine a numerical value for each of the fields that describes the corresponding pixel of the image 4435. The determined numerical values for each of the fields can be used to encode data describing features of the extracted image portion 4435 into a generated vector 4445. The generated vector 4445, which numerically represents the extracted image portion 4435, is provided to an input layer 1452 of the trained machine learning model 1440. The trained machine learning model 1440 can include, for example, a deep neural network.

The trained machine learning model 1450 processes the generated input vector 4445 through each of the one or more security feature discriminator layers 1454a, 1454b, 1454c and then propagates the resulting activation vector output by the last of the one or more security feature discriminator layers through the remaining layers of the trained machine learning model 1450. An output layer 1456 of the trained machine learning model 1450 can calculate output data 4455 such as a similarity score that is based on the activation vectors output by the last of the one or more security feature discriminator layers. The runtime system 400E can obtain the calculated output data 4455 generated by the trained machine learning model 1450 based on the trained machine learning model's 1450 processing of the generated input vector 4445 and provide the output data 4455 to an output evaluation unit 460.

In this example of FIG. 4E, the one or more trained security feature discriminator layers can detect the absence of a drop shadow at locations 4414a, 4414b, detect the absence of guilloche lines, determine that the image 4435 has a facial image having an increased facial aspect ratio, and determine that the image 4435 has a graphic 4416 that is too small. In such scenario, the machine learning model 1450 is trained to generate output data 4455 such as similarity score that satisfies a predetermined threshold score, thereby indicating that the extracted image portion 4435 deviates from legitimate images of a legitimate physical document having an anticounterfeiting architecture upon which the machine learning model 1450 was trained. The output evaluation unit 460, or other component of a computer system implementing the runtime system 400E can generate an output alert that is transmitted back to the device 405 to alert the TSA officer that the physical document 4410 is a counterfeit physical document. In such an implementations, the person that provided the physical document 4410 to the TSA officer could be denied entry to the portion of an airport terminal that is located beyond the security gates.

FIG. 4F is another example of a runtime system 400F that determines whether a physical document is a counterfeit physical document using a machine learning model that is trained to detect counterfeit physical documents. The runtime system 400F is the same as the runtime system 400E, as the runtime system 400F includes a device 405, an extraction unit 1430, a vector generation unit 440, a trained machine learning model 1450, and an output evaluation unit 460. In some implementations, the runtime system 400F can be implemented across multiple computers, with the device 405 being configured to communicate, using one or more networks, with one or more other computers hosting the other components of the system 400F. Alternatively, the components of the runtime system 400F can all be implemented within the device 405, with even the machine learning model 450 being hosted on the device 405.

Like the runtime system 400E, the runtime system 400F differs from the runtime system 400A because the trained machine learning model 1450 of FIG. 4F has been trained to include one or more security feature discriminator layers trained to detect the presence or absence of security features of an anticounterfeiting architecture in an image of an entire physical document. In contrast, the machine learning model 450 of FIG. 4A has one or more security feature discriminator layers that have been trained to detect the presence or absence of security features of an anticounterfeiting architecture in an extracted portion of an image of a physical document that depicts a facial image that appears in the physical document.

Similarly, like the runtime system 400E, the runtime system 400F also includes an extraction unit 1430 that differs from extraction unit 430 of FIG. 4A. The extraction unit 1430 differs from the extraction unit 430 because the extraction unit 1430 is configured to extract an entire physical document from an image for input into the trained machine learning model 1450. In contrast, the extraction unit 430 of FIG. 4A is configured to extract facial images from an image of a physical document.

In one implementation, a physical document 5410 can be presented, by a person, to a TSA officer in an airport security line. The TSA officer can use the runtime system 400F to determine whether the physical document 5410 is a counterfeit document. In this scenario, the physical document 4410 includes each of the security features of a legitimate anticounterfeiting architecture upon which the machine learning model 1450 was trained. The security features of the legitimate anticounterfeiting architecture include guilloche lines 5418 across the facial image 5412, a facial image 5412 with a proper aspect ratio, a facial image 5412 with a normal head orientation, a drop shadow 5414a, 5414b, and a properly sized graphic 5416. Nonetheless, the TSA officer can use the runtime system 400F to verify that the physical document 5410 is a legitimate physical document before letting the person pass through security.

The TSA officer can use a mobile device 405 such as a smartphone to generate an image 5420 of the physical document 5410. The image 5420 depicts a first portion 5420a that includes an image of the physical document 5410 and a second portion 5420b that includes an image of a portion of the surrounding environment when the image of the physical document 5410 was captured. The mobile device 405 can provide the generated image 5420 to an extraction unit 1430.

In the example of FIG. 4F, the extraction unit 1430 is configured to identify a particular portion of an image 5420 of a physical document 5410 that corresponds to the portion of the image 5420a depicting the entirety of the physical document 5410. The extraction unit 1430 is configured to identify the portion 5420a of the image 5420 because the machine learning model 1450 includes one or more security feature discriminator layers 1454a, 1454b, 1454c that have been trained to detect the presence or absence of security features in an image of an entire physical document. Accordingly, in this example, the extraction unit 1430 can be configured to identify the boundaries between portion 5420a and 5420b of the image 5420 and extract the portion 5420a from the image 5420. In such implementations, the extraction unit 1430 can discard the portion 5420b so that only an extracted image portion 5435 remains, which corresponds to an image of the physical document 5410. The extracted image portion 5435 is output by the extraction unit 1430. As shown in FIG. 4F, the extracted image portion 5435 includes security features such as guilloche lines 5418 across the facial image 5412, a facial image 5412 with a proper aspect ratio, a facial image 5412 with a normal head orientation, a drop shadow 5414a, 5414b, and a properly sized graphic 5416.

The runtime system 400F can provide the extracted image portion 5435 to the vector generation unit 440. The vector generation unit 440 can generate input data that represents the extracted image portion 5435 for input to the machine learning model 1450 that has been trained to include one or more trained security feature discriminator layers for detecting the presence or absence of security features of a vector representing an image of an entire physical document. The generated input data can include a vector 5445 that numerically represents the extracted image portion 5435. For example, the vector 5445 can include a plurality of fields that each correspond to a pixel of the image 5435. The vector generation unit 440 can determine a numerical value for each of the fields that describes the corresponding pixels of the image 5435. The determined numerical values for each of the fields can be used to encode data describing features of the extracted image portion 5435 into the generated vector 5445. The generated vector 5445, which numerically represents the extracted image portion 5435, is provided to an input layer 1452 of the trained machine learning model 1450. The trained machine learning model 1450 can include, for example, a deep neural network.

The trained machine learning model 1450 processes the generated input vector 5445 through each of the one or more security feature discriminator layers 1454*a*, 1454*b*, 1454*c* and then propagates the resulting activation vector output by the last of the one or more security feature discriminator layers through the remaining layers of the trained machine learning model 1450. An output layer 1456 of the trained machine learning model 1450 can calculate output data 5455 such as a similarity score that is based on the activation vectors output by the last of the one or more security feature discriminator layers. The runtime system 400F can obtain the calculated output data 5455 generated by the trained machine learning model 1450 based on the trained machine learning model's 1450 processing of the generated input vector 5445 and provide the output data 5455 to an output evaluation unit 460.

In this example of FIG. 4F, the one or more trained security feature discriminator layers can detect security features of the extracted image portion 5435 that include guilloche lines 5418 across the facial image 5412, a facial image 5412 with a proper aspect ratio, a facial image 5412 with a normal head orientation, a drop shadow 5414*a*, 5414*b*, and a properly sized graphic 5416. In such a scenario, the machine learning model 1450 is trained to generate output data 5455 such as similarity score that does not satisfy a predetermined threshold score, thereby indicating that the extracted image portion 5435 does not deviate from legitimate images of a legitimate physical document having an anticounterfeiting architecture upon which the machine learning model 1450 was trained. The output evaluation unit 460, or other component of a computer system implementing the runtime system 400F can generate an output alert that is transmitted back to the device 405 to alert the TSA officer that the physical document 5410 is a legitimate physical document. In such a scenario, the TSA officer can allow the person who provided the physical document 5410 to pass through security.

Figure 5:
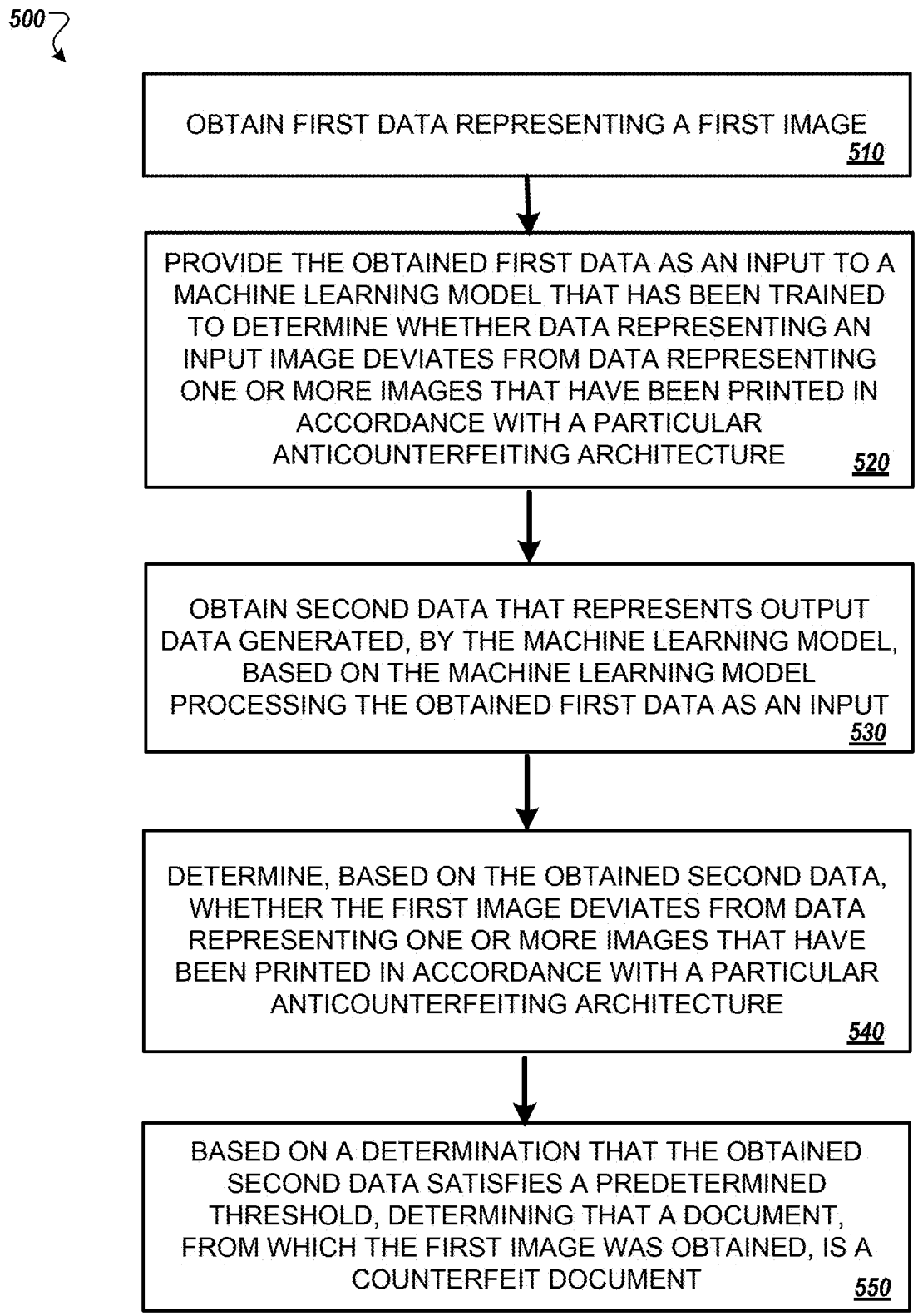
FIG. 5 is a flowchart of an example of a runtime process that is used to determine whether a physical document is a counterfeit physical document.

FIG. 5 is a flowchart of an example of a runtime process 500 that is used to determine whether a document is a counterfeit document. In general, the runtime process 500 includes obtaining first data representing a first image (510), providing the obtained first data an input to the machine learning model that has been trained to determine whether data representing an input image deviates from data representing one or more images that have been printed in accordance with a particular anticounterfeiting architecture (520), obtaining second data that represents output data generated, by the machine learning model, based on the machine learning model processing the obtained first data as an input (530), determining, based on the obtained second data, whether the first image deviates from data representing one or more images that have been printed in accordance with a particular anticounterfeiting architecture by, in some implementations, evaluating the obtained second data against a predetermined threshold (540), and based on a determination that the obtained second data satisfies a predetermined threshold, determining that a document, from which the first image was obtained, is a counterfeit document (550).

Figure 6A:
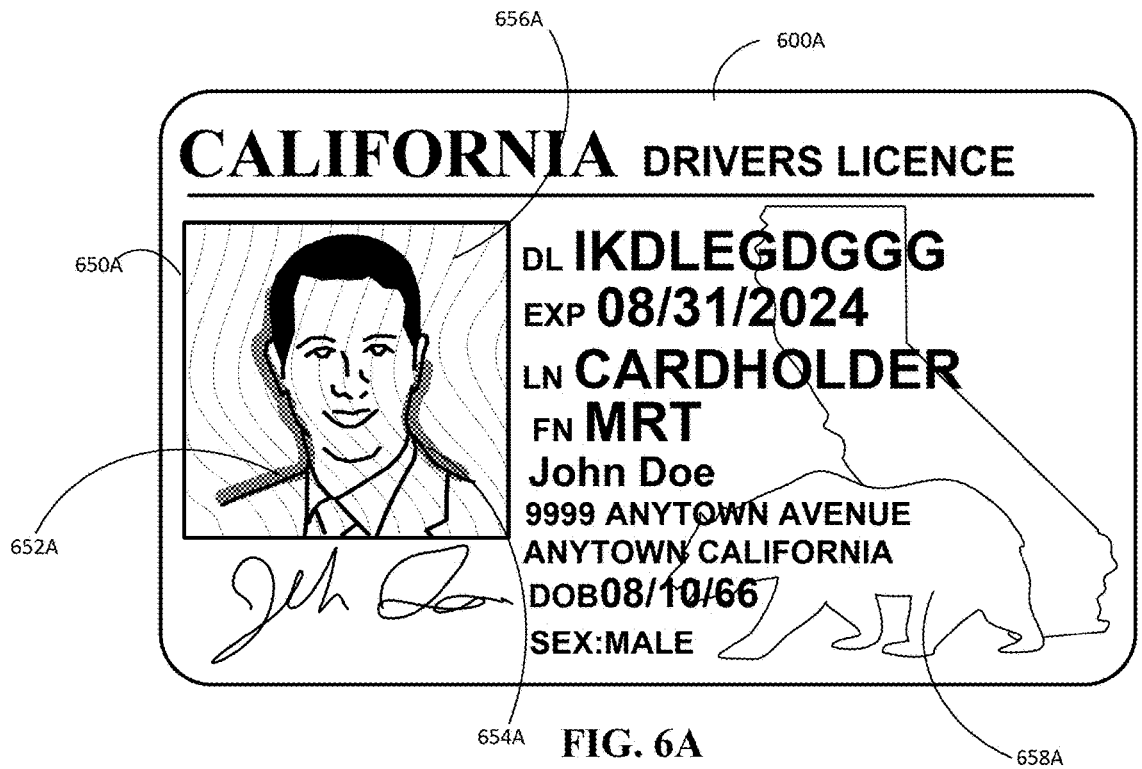
FIG. 6A is a representation of an exploded view of an example of a legitimate physical document.

FIG. 6A is a representation of an exploded view of an example of a legitimate physical document 600A. The legitimate physical document 600A is the same as the example of the legitimate physical document 160A shown in at least FIG. 1. However, the legitimate physical document 600A is provided to show the security features of the legitimate physical document 600A and 160A in more detail.

With reference to FIG. 6A, the legitimate physical document 600A includes security features such as a facial image 650A having a proper facial image contrast ratio, a proper facial orientation, a drop shadow 652A, 654A, guilloche lines 656A across the facial image 650A, and properly sized graphic 658A. These security features make up the anticounterfeiting architecture for the physical document 600A in this example.

Figure 6B:
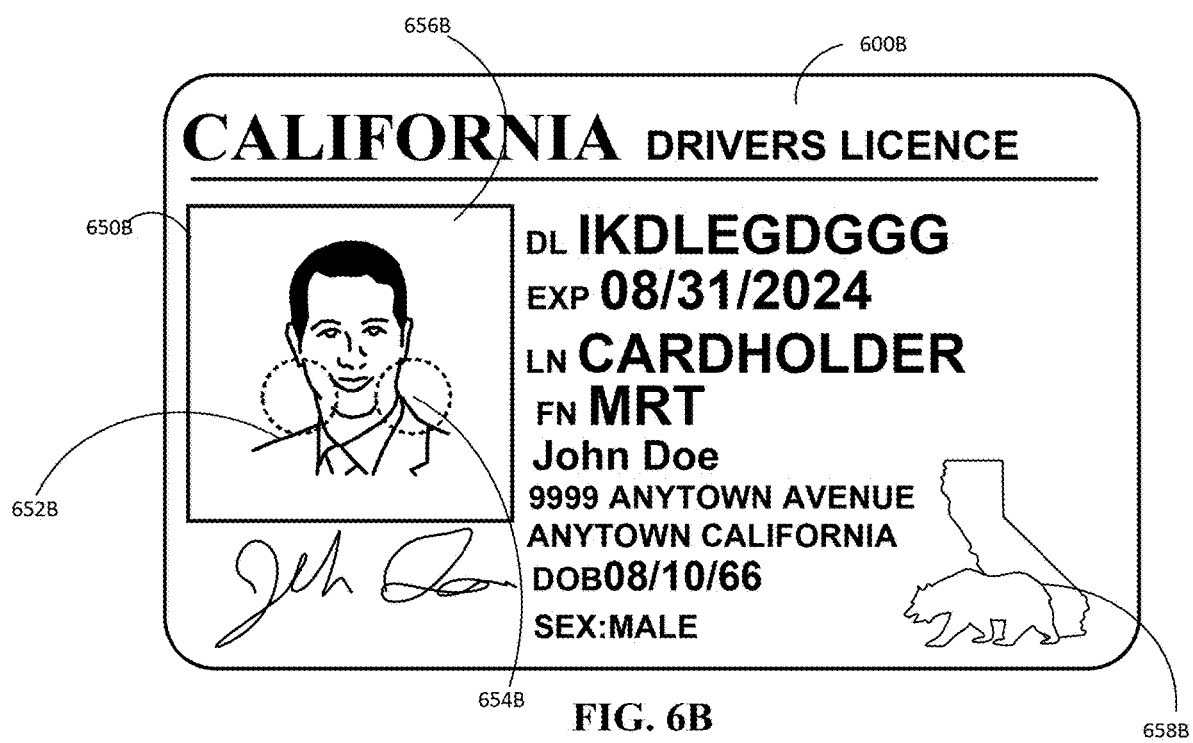
FIG. 6B is a representation of an exploded view of an example of a counterfeit physical document.

FIG. 6B is a representation of an exploded view of an example of a counterfeit physical document 600B. The counterfeit physical document 600B is the same as the example of the counterfeit physical document 160B of FIG. 1. However, the counterfeit physical document 600B is provided to show an example of a physical document that lacks security features of the anticounterfeiting architecture of legitimate physical documents 600A and 160A in more detail.

With reference to FIG. 6B, the counterfeit physical document 600B does not include a drop shadow at locations 652B, 654B, the facial image 650B is of a decreased aspect ratio, the facial image 650B does not have guilloche lines over the facial image 650B at 656B, and the graphic 658B is of an improper size because it is too small.

The machine learning model described herein can be trained using the process described with respect to FIGS. 2 and 3 to distinguish between images of legitimate physical documents having a particular anticounterfeiting architecture of security features and images of counterfeit physical documents that fail to meet one or more features of the anticounterfeiting architecture upon which the machine learning model was trained.

Figure 7A:
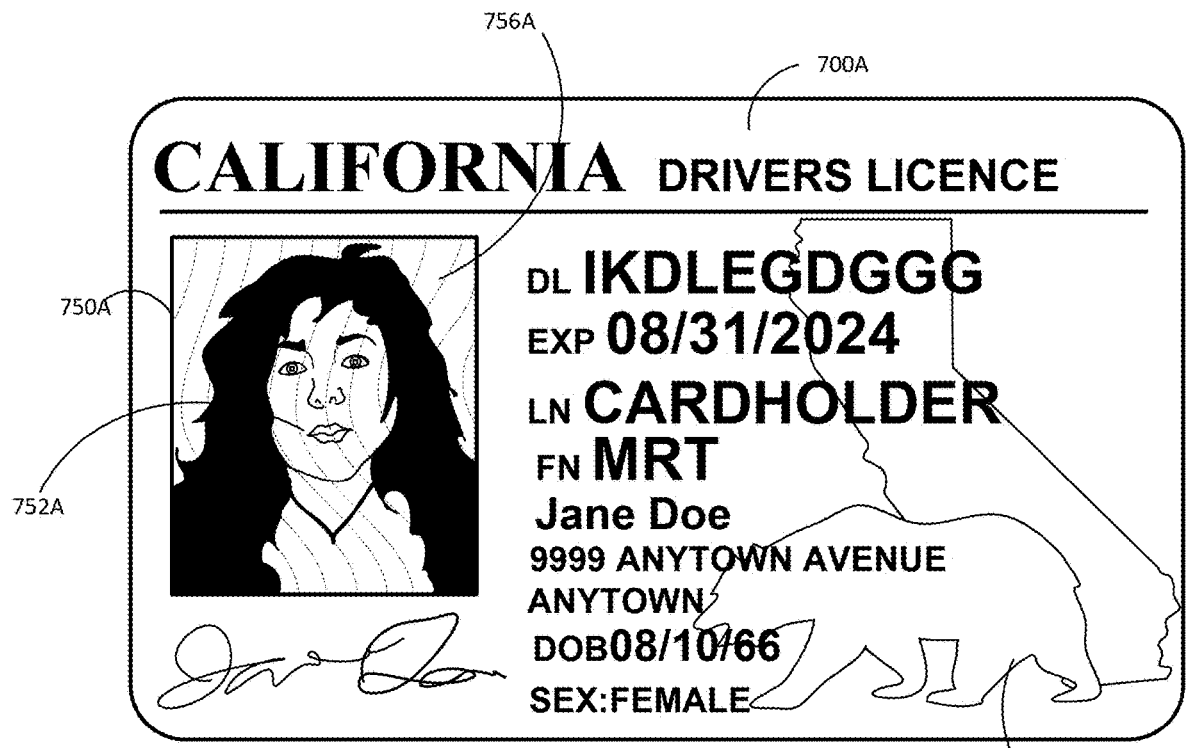
FIG. 7A is a representation of an exploded view of an example of a legitimate physical document.

FIG. 7A is a representation of an exploded view of an example of a legitimate document 700A. The legitimate physical document 700A is the same as the example of the legitimate physical document 3410 shown in FIG. 4D. However, the legitimate physical document 700A is provided to show the security features of the legitimate physical document 700A and 3410 in more detail.

With reference to FIG. 7A, the legitimate physical document 700A includes security features such as a facial image 750A having a proper facial image contrast ratio, a proper facial orientation 752A, guilloche lines 756A across the facial image 750A, and properly sized graphic 758A. These security features make up the anticounterfeiting architecture for the physical document 700A in this example.

Figure 7B:
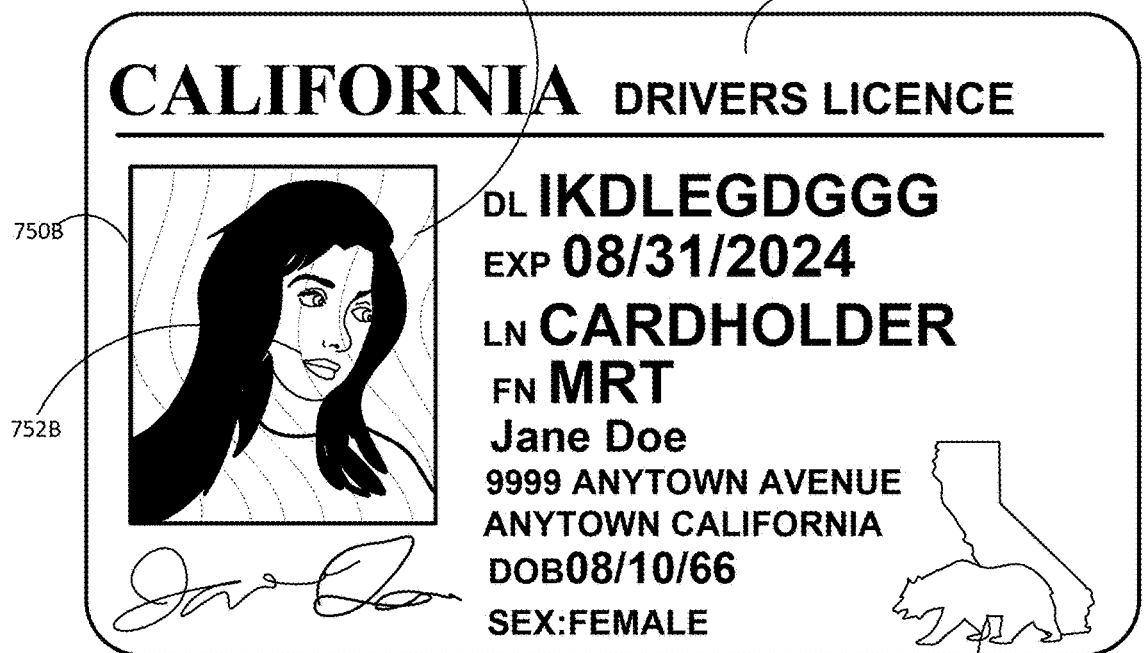
FIG. 7B is a representation of an exploded view of an example of a counterfeit physical document.

FIG. 7B is a representation of an exploded view of an example of a counterfeit document 700B. However, the counterfeit physical document 700B is provided to show an example of a physical document that lacks security features of the anticounterfeiting architecture of legitimate physical documents 700A and 3410 in more detail.

With reference to FIG. 7B, the counterfeit physical document 700B does indeed have certain legitimate security features such as guilloche lines 756B over the facial image 750B and a facial image 750B with a proper aspect ratio. However, the counterfeit physical document 700B includes a facial image 750B having an abnormal head tilt 752B and an improperly sized graphic 758B.

The machine learning model described herein can be trained using the process described with respect to FIGS. 2 and 3 to distinguish between images of legitimate physical documents having a particular anticounterfeiting architecture of security features and images of counterfeit physical documents that fail to meet one or more features of the anticounterfeiting architecture upon which the machine learning model was trained.

Figure 8:
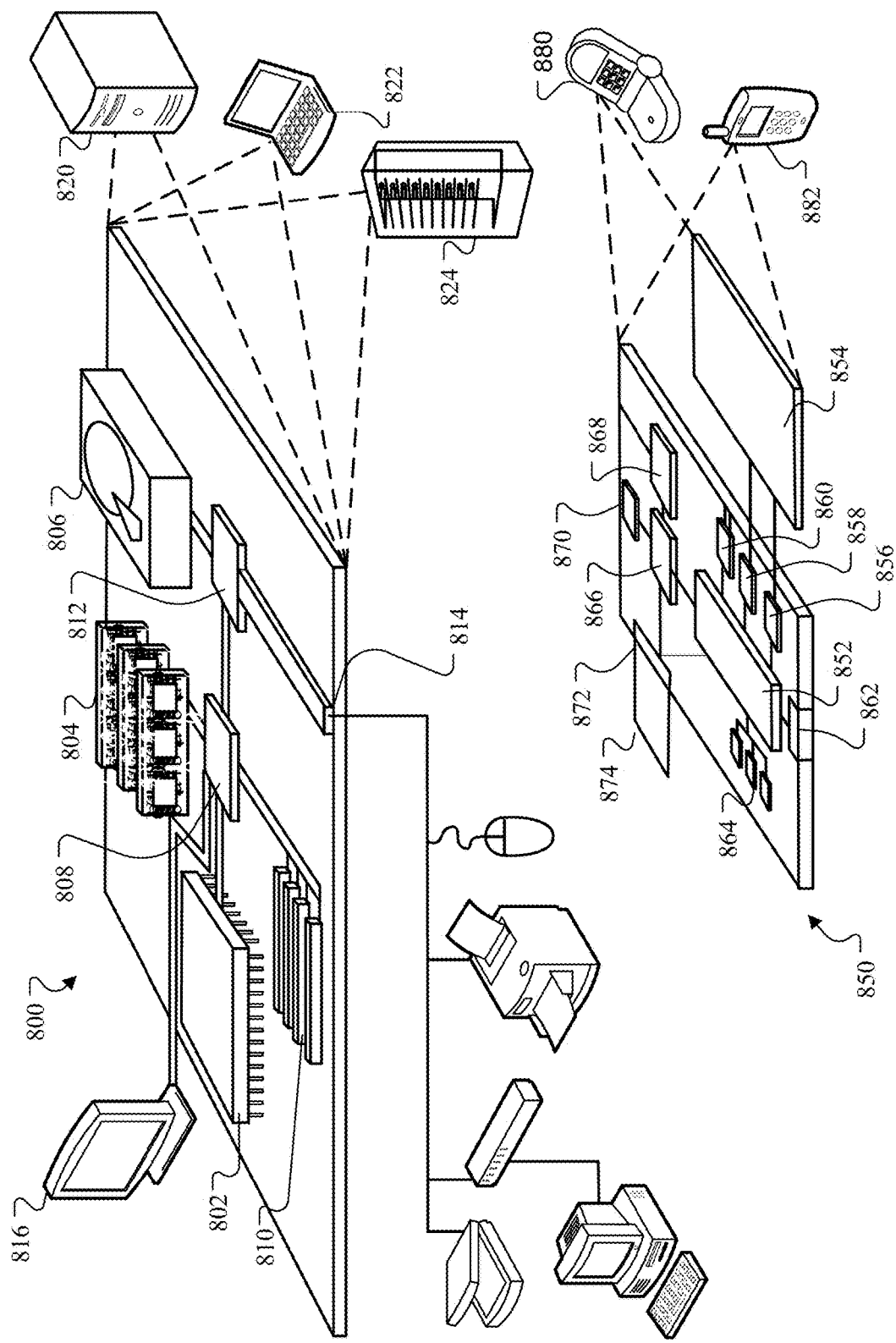
FIG. 8 is a block diagram of system components that can be used to implement a system for using a trained machine learning model to detect counterfeit physical documents.

FIG. 8 is a block diagram of system 800 components that can be used to implement a system for using a trained machine learning model to detect counterfeit physical documents.

Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. Additionally, computing device 800 or 850 can include Universal Serial Bus (USB) flash drives. The USB flash drives can store operating systems and other applications. The USB flash drives can include input/output components, such as a wireless transmitter or USB connector that can be inserted into a USB port of another computing device. The components shown here, their connections and relationships, and their functions, are meant to be exemplary only, and are not meant to limit implementations of the inventions described and/or claimed in this document.

Computing device 800 includes a processor 802, memory 804, a storage device 808, a high-speed interface 808 connecting to memory 804 and high-speed expansion ports 810, and a low speed interface 812 connecting to low speed bus 814 and storage device 808. Each of the components 802, 804, 808, 808, 810, and 812, are interconnected using various busses, and can be mounted on a common motherboard or in other manners as appropriate. The processor 802 can process instructions for execution within the computing device 800, including instructions stored in the memory 804 or on the storage device 808 to display graphical information for a GUI on an external input/output device, such as display 816 coupled to high speed interface 808. In other implementations, multiple processors and/or multiple buses can be used, as appropriate, along with multiple memories and types of memory. Also, multiple computing devices 800 can be connected, with each device providing portions of the necessary operations, e.g., as a server bank, a group of blade servers, or a multi-processor system.

The memory 804 stores information within the computing device 800. In one implementation, the memory 804 is a volatile memory unit or units. In another implementation, the memory 804 is a non-volatile memory unit or units. The memory 804 can also be another form of computer-readable medium, such as a magnetic or optical disk.

The storage device 808 is capable of providing mass storage for the computing device 800. In one implementation, the storage device 808 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The information carrier is a computer- or machine-readable medium, such as the memory 804, the storage device 808, or memory on processor 802.

The high speed controller 808 manages bandwidth-intensive operations for the computing device 800, while the low speed controller 812 manages lower bandwidth intensive operations. Such allocation of functions is exemplary only. In one implementation, the high-speed controller 808 is coupled to memory 804, display 816, e.g., through a graphics processor or accelerator, and to high-speed expansion ports 810, which can accept various expansion cards (not shown). In the implementation, low-speed controller 812 is coupled to storage device 808 and low-speed expansion port 814. The low-speed expansion port, which can include various communication ports, e.g., USB, Bluetooth, Ethernet, wireless Ethernet can be coupled to one or more input/output devices, such as a keyboard, a pointing device, microphone/speaker pair, a scanner, or a networking device such as a switch or router, e.g., through a network adapter. The computing device 800 can be implemented in a number of different forms, as shown in the figure. For example, it can be implemented as a standard server 820, or multiple times in a group of such servers. It can also be implemented as part of a rack server system 824. In addition, it can be implemented in a personal computer such as a laptop computer 822. Alternatively, components from computing device 800 can be combined with other components in a mobile device (not shown), such as device 850. Each of such devices can contain one or more of computing device 800, 850, and an entire system can be made up of multiple computing devices 800, 850 communicating with each other.

The computing device 800 can be implemented in a number of different forms, as shown in the figure. For example, it can be implemented as a standard server 820, or multiple times in a group of such servers. It can also be implemented as part of a rack server system 824. In addition, it can be implemented in a personal computer such as a laptop computer 822. Alternatively, components from computing device 800 can be combined with other components in a mobile device (not shown), such as device 850. Each of such devices can contain one or more of computing device 800, 850, and an entire system can be made up of multiple computing devices 800, 850 communicating with each other.

Computing device 850 includes a processor 852, memory 864, and an input/output device such as a display 854, a communication interface 866, and a transceiver 868, among other components. The device 850 can also be provided with a storage device, such as a micro-drive or other device, to provide additional storage. Each of the components 850, 852, 864, 854, 866, and 868, are interconnected using various buses, and several of the components can be mounted on a common motherboard or in other manners as appropriate.

The processor 852 can execute instructions within the computing device 850, including instructions stored in the memory 864. The processor can be implemented as a chipset of chips that include separate and multiple analog and digital processors. Additionally, the processor can be implemented using any of a number of architectures. For example, the processor 810 can be a CISC (Complex Instruction Set Computers) processor, a RISC (Reduced Instruction Set Computer) processor, or a MISC (Minimal Instruction Set Computer) processor. The processor can provide, for example, for coordination of the other components of the device 850, such as control of user interfaces, applications run by device 850, and wireless communication by device 850.

Processor 852 can communicate with a user through control interface 858 and display interface 856 coupled to a display 854. The display 854 can be, for example, a TFT (Thin-Film-Transistor Liquid Crystal Display) display or an OLED (Organic Light Emitting Diode) display, or other appropriate display technology. The display interface 856 can comprise appropriate circuitry for driving the display 854 to present graphical and other information to a user. The control interface 858 can receive commands from a user and convert them for submission to the processor 852. In addition, an external interface 862 can be provide in communication with processor 852, so as to enable near area communication of device 850 with other devices. External interface 862 can provide, for example, for wired communication in some implementations, or for wireless communication in other implementations, and multiple interfaces can also be used.

The memory 864 stores information within the computing device 850. The memory 864 can be implemented as one or more of a computer-readable medium or media, a volatile memory unit or units, or a non-volatile memory unit or units. Expansion memory 874 can also be provided and connected to device 850 through expansion interface 872, which can include, for example, a SIMM (Single In Line Memory Module) card interface. Such expansion memory 874 can provide extra storage space for device 850, or can also store applications or other information for device 850. Specifically, expansion memory 874 can include instructions to carry out or supplement the processes described above, and can include secure information also. Thus, for example, expansion memory 874 can be provide as a security module for device 850, and can be programmed with instructions that permit secure use of device 850. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852 that can be received, for example, over transceiver 868 or external interface 862.

Device 850 can communicate wirelessly through communication interface 866, which can include digital signal processing circuitry where necessary. Communication interface 866 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 868. In addition, short-range communication can occur, such as using a Bluetooth, Wi-Fi, or other such transceiver (not shown). In addition, GPS (Global Positioning System) receiver module 870 can provide additional navigation- and location-related wireless data to device 850, which can be used as appropriate by applications running on device 850.

Device 850 can also communicate audibly using audio codec 860, which can receive spoken information from a user and convert it to usable digital information. Audio codec 860 can likewise generate audible sound for a user, such as through a speaker, e.g., in a handset of device 850. Such sound can include sound from voice telephone calls, can include recorded sound, e.g., voice messages, music files, etc. and can also include sound generated by applications operating on device 850.

The computing device 850 can be implemented in a number of different forms, as shown in the figure. For example, it can be implemented as a cellular telephone 880. It can also be implemented as part of a smartphone 882, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

Experimental Results

Figure 9:
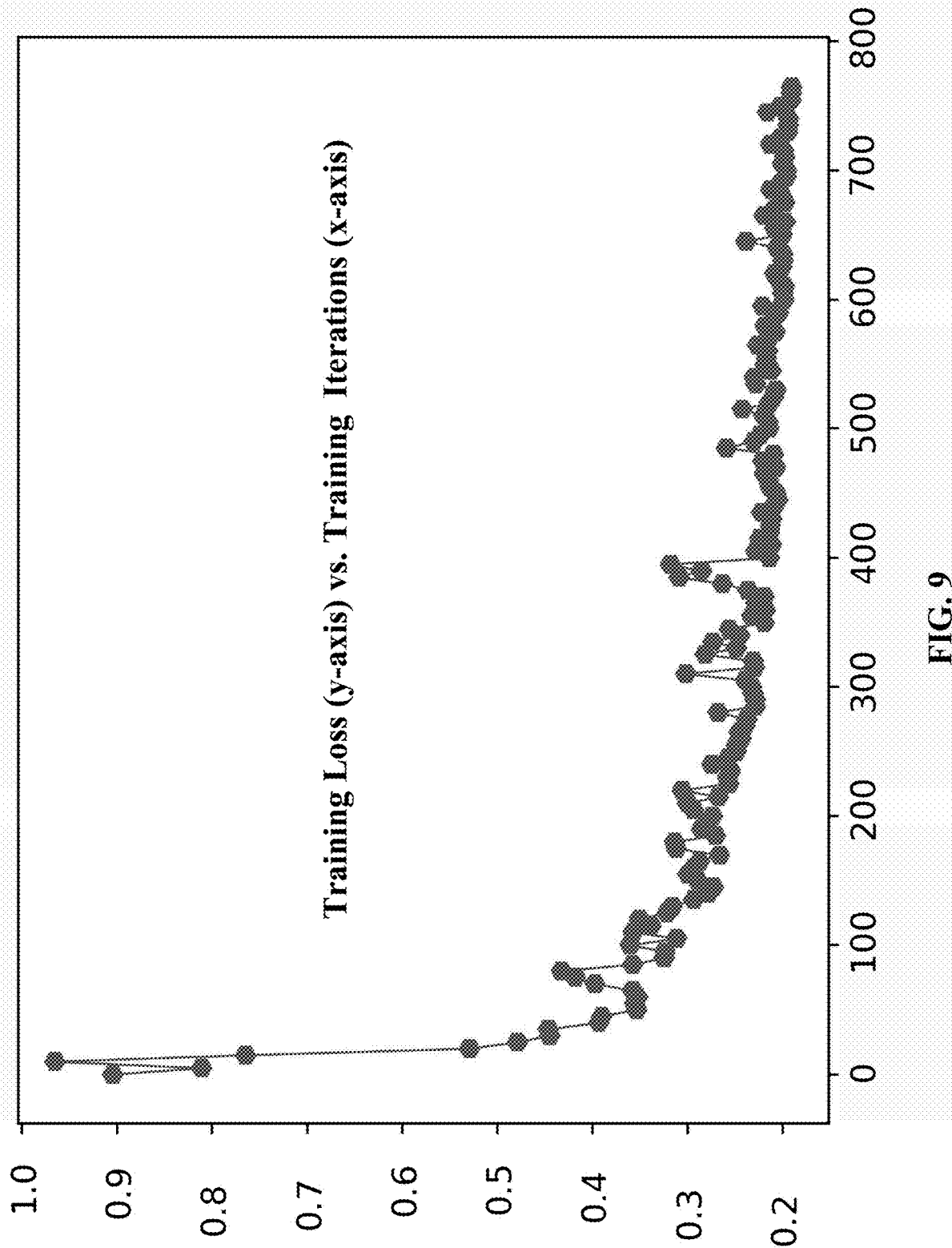
FIG. 9 is an example of experimental results of test loss versus testing iterations, which demonstrates that the machine learning model converges efficiently over few training iterations.

A first example of experimental results is shown in FIG. 9. Specifically, FIG. 9 is an example of experimental results of test loss versus testing iterations, which demonstrates that the machine learning model converges quickly over few training iterations. In this example, the results show that the test loss that occurs (e.g., less than 20%) during training is significantly reduced over relatively few training iterations (e.g., between 500 to 800 training iterations). Such loss can be further reduced with more training iterations, if necessary.

Figure 10:
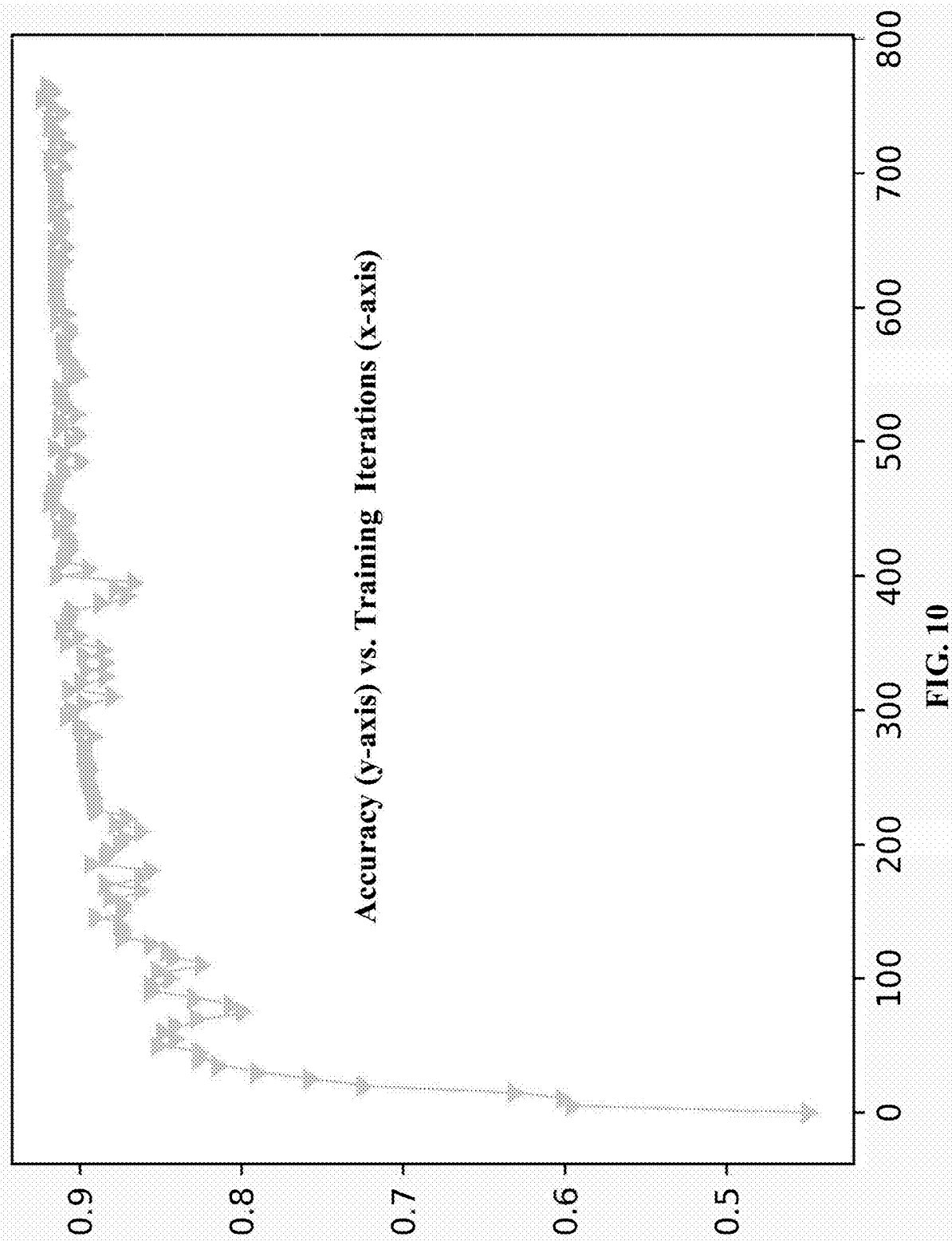
FIG. 10 is an example of experimental results of test accuracy vs testing iterations, which demonstrate that the accuracy the trained machine learning model.

A second example of experimental results is shown in FIG. 10. Specifically, FIG. 10 is an example of experimental results of test accuracy vs testing iterations, which demonstrate that the accuracy of the trained machine learning model is above 90%. In this example, the results show that the trained machine learning model has a high accuracy rate of 93.7% over a relatively few training iterations (e.g., between 500 to 800 training iterations). Such accuracy can be increased further with more training iterations, if necessary.

Conventional methods of fraud determination can include use of multiple layers of processing such as a first classification layer, a second layer related to multiple feature selection, and a third layer of multiple genuine and counterfeit feature matching (e.g., learned, heuristic, or both) focused on anti-counterfeiting specific features in a layered approach. Such conventional methods can take approximately 5-10 s of processing on a contemporary server class computer per image and only results in a 60-80% accuracy which varies by document type. In contrast, system and methods that use the trained machine learning model described in this specification can achieve approximately 93.7% accuracy without any additional pipeline steps such as classification or specific security feature selection and fusion. In addition, the system and methods that use the trained machine learning model can achieve these higher accuracy results in between approximately 100-200 ms (0.1-0.2 s) on the same server class hardware. Therefore, the system and methods using the trained machine learning model of the present disclosure can achieve greater accuracy, with superior computational performance, generally across all classes of documents, which is a significant improvement. Further, since it is completely unrelated to those previous methods, therefore completely orthogonal, in some implementations, it can be fused with those conventional authentication methods to achieve an even higher aggregate accuracy performance without adding latency to the system in parallel or in a pipelined fashion. Accordingly, the system and methods using the trained machine learning model of the present disclosure can be used as a fast first step with a confidence threshold, which can then call one or more models using conventional methods to perform more intense computational verification methods only if required. Such aggregate analysis that fuses the teachings of the present disclosure with conventional methods can lead to computational cost performance improvements of 33-66× over existing methods.

The invention claimed is:

1. A data processing system for counterfeit document detection, the data processing system comprising:
one or more processors; and
one or more storage devices, wherein the one or more storage devices includes instructions that, when executed by the one or more processors, cause the one or more processors to perform operations, the operations comprising:
obtaining, by the data processing system, first data representing a first image;
providing, by the data processing system, the obtained first data as an input to a machine learning model that has been trained to determine whether data representing an input image deviates from data representing one or more images of a physical document that have been printed in accordance with a particular anticounterfeiting architecture, wherein the anticounterfeiting architecture includes two or more security features, wherein the two or more security features includes two or more of (i) presence of a predetermined facial aspect ratio, (ii) presence of a predetermined head orientation, (iii) presence of a drop shadow, (iv) presence of guilloche lines over a facial image, or (v) presence of a predetermined graphic;
obtaining, by the data processing system, second data that represents output data generated, by the machine learning model, based on the machine learning model processing the obtained first data as an input;
determining, by the data processing system and based on the obtained second data, whether the first image deviates from data representing one or more images of a physical document that have been printed in accordance with a particular anticounterfeiting architecture, comprising:
evaluating the obtained second data against a predetermined threshold; and
based on a determination that the obtained second data satisfies a predetermined threshold, storing third data indicating that a document, from which the first image was obtained, is a counterfeit document.

2. The data processing system of claim 1, wherein obtaining, by the data processing system, first data representing a first image comprises:
capturing, using a camera, second data representing an image of a document;
extracting, from the second data representing an image of the document, the first data representing a first image, wherein the first image is an image of at least a portion of a person.

3. The data processing system of claim 1, wherein obtaining, by the data processing system, first data representing a first image comprises:
receiving, from a device that used a camera to capture second data representing an image of a document, the second data representing an image of the document; and
extracting, from the second data representing an image of the document, the first data representing the first image.

4. The data processing system of claim 1, wherein obtaining, by the data processing system, first data representing a first image comprises:
receiving, from a device, the first data representing the first image.

5. The data processing system of claim 1, wherein the machine learning model that has been trained to determine whether data representing an input image deviates from data representing one or more images of a physical document that have been printed in accordance with a particular anticounterfeiting architecture comprises:
one or more security feature discriminator layers that have been trained to detect the (i) presence of a security feature or (ii) absence of a security feature.

6. The data processing system of claim 1, the operations further comprising:
obtaining, by the data processing system, fourth data representing a second image;
providing, by the data processing system, the obtained fourth data as an input to a machine learning model that has been trained to determine whether data representing an input image deviates from data representing one or more images of a physical document that have been printed in accordance with a particular anticounterfeiting architecture;
obtaining, by the data processing system, fifth data that represents output data generated, by the machine learning model, based on the machine learning model processing the obtained fourth data as an input;
determining, by the data processing system and based on the obtained fifth data, whether the second image deviates from data representing one or more images of a physical document that have been printed in accordance with a particular anticounterfeiting architecture, comprising: evaluating the obtained fifth data against a predetermined threshold; and
based on a determination that the obtained fifth data does not satisfy a predetermined threshold, storing sixth data indicating that a document, from which the second image was obtained, is a legitimate document.

7. The data processing system of claim 1, wherein training the machine learning model comprise:
accessing, by the machine learning model, a plurality of training images of respective physical documents, wherein each training image of the plurality of training images have been labeled as (i) an image of a legitimate physical document or (ii) an image of a counterfeit physical document; and
for each particular image of the plurality of training images:
extracting a particular portion of the particular image of a physical document;
generating an input vector for the extracted particular portion of the particular image of a physical document;
processing, by the machine learning model, the generated input vector through one or more hidden layers of the machine learning model;
obtaining output data, generated by the machine learning model based on the machine learning model's processing of the generated input vector representing the extracted particular portion of the particular image of the physical document;
determining an amount of error that exists between the obtained output data and a label for the particular image; and
adjusting one or more parameters of the machine learning model based on the determined amount of error.

8. A method for counterfeit document detection, the method comprising:
obtaining, by the data processing system, first data representing a first image;
providing, by the data processing system, the obtained first data as an input to a machine learning model that has been trained to determine whether data representing an input image deviates from data representing one or more images of a physical document that have been printed in accordance with a particular anticounterfeiting architecture, wherein the anticounterfeiting architecture includes two or more security features, wherein the two or more security features includes two or more of (i) presence of a predetermined facial aspect ratio, (ii) presence of a predetermined head orientation, (iii) presence of a drop shadow, (iv) presence of guilloche lines over a facial image, or (v) presence of a predetermined graphic;
obtaining, by the data processing system, second data that represents output data generated, by the machine learning model, based on the machine learning model processing the obtained first data as an input;
determining, by the data processing system and based on the obtained second data, whether the first image deviates from data representing one or more images of a physical document that have been printed in accordance with a particular anticounterfeiting architecture, comprising:
evaluating the obtained second data against a predetermined threshold; and
based on a determination that the obtained second data satisfies a predetermined threshold, storing third data indicating that a document, from which the first image was obtained, is a counterfeit document.

9. The method of claim 8, wherein obtaining, by the data processing system, first data representing a first image comprises:
capturing, using a camera, second data representing an image of a document;
extracting, from the second data representing an image of the document, the first data representing a first image, wherein the first image is an image of at least a portion of a person.

10. The method of claim 8, wherein obtaining, by the data processing system, first data representing a first image comprises:
receiving, from a device that used a camera to capture second data representing an image of a document, the second data representing an image of the document; and
extracting, from the second data representing an image of the document, the first data representing the first image.

11. The method of claim 8, wherein obtaining, by the data processing system, first data representing a first image comprises:
receiving, from a device, the first data representing the first image.

12. The method of claim 8, wherein the machine learning model that has been trained to determine whether data representing an input image deviates from data representing one or more images of a physical document that have been printed in accordance with a particular anticounterfeiting architecture comprises:

one or more security feature discriminator layers that have been trained to detect the (i) presence of a security feature or (ii) absence of a security feature.

13. The method of claim 8, the method further comprising:
obtaining, by the data processing system, fourth data representing a second image;
providing, by the data processing system, the obtained fourth data as an input to a machine learning model that has been trained to determine whether data representing an input image deviates from data representing one or more images of a physical document that have been printed in accordance with a particular anticounterfeiting architecture;
obtaining, by the data processing system, fifth data that represents output data generated, by the machine learning model, based on the machine learning model processing the obtained fourth data as an input;
determining, by the data processing system and based on the obtained fifth data, whether the second image deviates from data representing one or more images of a physical document that have been printed in accordance with a particular anticounterfeiting architecture, comprising: evaluating the obtained fifth data against a predetermined threshold; and
based on a determination that the obtained fifth data does not satisfy a predetermined threshold, storing sixth data indicating that a document, from which the second image was obtained, is a legitimate document.

14. The method of claim 8, wherein training the machine learning model comprise:
accessing, by the machine learning model, a plurality of training images of respective physical documents, wherein each training image of the plurality of training images have been labeled as (i) an image of a legitimate physical document or (ii) an image of a counterfeit physical document; and
for each particular image of the plurality of training images:
extracting a particular portion of the particular image of a physical document;
generating an input vector for the extracted particular portion of the particular image of a physical document;
processing, by the machine learning model, the generated input vector through one or more hidden layers of the machine learning model;
obtaining output data, generated by the machine learning model based on the machine learning model's processing of the generated input vector representing the extracted particular portion of the particular image of the physical document;
determining an amount of error that exists between the obtained output data and a label for the particular image; and
adjusting one or more parameters of the machine learning model based on the determined amount of error.

15. A computer-readable storage device having stored thereon instructions, which, when executed by data processing apparatus, cause the data processing apparatus to perform operations comprising:
obtaining, by the data processing system, first data representing a first image;
providing, by the data processing system, the obtained first data as an input to a machine learning model that has been trained to determine whether data representing an input image deviates from data representing one or more images of a physical document that have been printed in accordance with a particular anticounterfeiting architecture, wherein the anticounterfeiting architecture includes two or more security features, wherein the two or more security features includes two or more of (i) presence of a predetermined facial aspect ratio, (ii) presence of a predetermined head orientation, (iii) presence of a drop shadow, (iv) presence of guilloche lines over a facial image, or (v) presence of a predetermined graphic;
obtaining, by the data processing system, second data that represents output data generated, by the machine learning model, based on the machine learning model processing the obtained first data as an input;
determining, by the data processing system and based on the obtained second data, whether the first image deviates from data representing one or more images of a physical document that have been printed in accordance with a particular anticounterfeiting architecture, comprising:
evaluating the obtained second data against a predetermined threshold; and
based on a determination that the obtained second data satisfies a predetermined threshold, storing third data indicating that a document, from which the first image was obtained, is a counterfeit document.

16. The computer-readable storage device of claim 15, wherein obtaining, by the data processing system, first data representing a first image comprises:
capturing, using a camera, second data representing an image of a document;
extracting, from the second data representing an image of the document, the first data representing a first image, wherein the first image is an image of at least a portion of a person.

17. The computer-readable storage device of claim 15, wherein obtaining, by the data processing system, first data representing a first image comprises:
receiving, from a device that used a camera to capture second data representing an image of a document, the second data representing an image of the document; and
extracting, from the second data representing an image of the document, the first data representing the first image.

18. The computer-readable storage device of claim 15, wherein obtaining, by the data processing system, first data representing a first image comprises:
receiving, from a device, the first data representing the first image.

19. The computer-readable storage device of claim 15, wherein the machine learning model that has been trained to determine whether data representing an input image deviates from data representing one or more images of a physical document that have been printed in accordance with a particular anticounterfeiting architecture comprises:
one or more security feature discriminator layers that have been trained to detect the (i) presence of a security feature or (ii) absence of a security feature.

20. The computer-readable storage device of claim 15, the operations further comprising:
obtaining, by the data processing system, fourth data representing a second image;
providing, by the data processing system, the obtained fourth data as an input to a machine learning model that has been trained to determine whether data representing an input image deviates from data representing one or more images of a physical document that have been printed in accordance with a particular anticounterfeiting architecture;

obtaining, by the data processing system, fifth data that represents output data generated, by the machine learning model, based on the machine learning model processing the obtained fourth data as an input;

determining, by the data processing system and based on the obtained fifth data, whether the second image deviates from data representing one or more images of a physical document that have been printed in accordance with a particular anticounterfeiting architecture, comprising: evaluating the obtained fifth data against a predetermined threshold; and based on a determination that the obtained fifth data does not satisfy a predetermined threshold, storing sixth data indicating that a document, from which the second image was obtained, is a legitimate document.

21. The computer-readable storage device of claim 15, wherein training the machine learning model comprise:

accessing, by the machine learning model, a plurality of training images of respective physical documents, wherein each training image of the plurality of training images have been labeled as (i) an image of a legitimate physical document or (ii) an image of a counterfeit physical document; and for each particular image of the plurality of training images:
extracting a particular portion of the particular image of a physical document;
generating an input vector for the extracted particular portion of the particular image of a physical document;
processing, by the machine learning model, the generated input vector through one or more hidden layers of the machine learning model;
obtaining output data, generated by the machine learning model based on the machine learning model's processing of the generated input vector representing the extracted particular portion of the particular image of the physical document;
determining an amount of error that exists between the obtained output data and a label for the particular image; and
adjusting one or more parameters of the machine learning model based on the determined amount of error.

* * * * *